United States Patent
Onuma et al.

(10) Patent No.: US 10,014,536 B2
(45) Date of Patent: Jul. 3, 2018

(54) FUEL CELL SYSTEM

(71) Applicants: PANASONIC CORPORATION, Osaka (JP); TOTO LTD., Fukuoka (JP)

(72) Inventors: Shigenori Onuma, Kyoto (JP); Noboru Taniguchi, Osaka (JP); Yasushi Kaneko, Osaka (JP); Toru Sukawa, Osaka (JP); Osamu Sakai, Osaka (JP); Yuichi Mikami, Kyoto (JP); Hiroshi Shirahama, Kanagawa (JP); Toshiharu Otsuka, Fukuoka (JP)

(73) Assignees: Panasonic Corporation, Osaka (JP); TOTO LTD., Fukuoka (JP)

( * ) Notice: Subject to any disclaimer, the term of this patent is extended or adjusted under 35 U.S.C. 154(b) by 55 days.

(21) Appl. No.: 15/103,812

(22) PCT Filed: Feb. 13, 2015

(86) PCT No.: PCT/JP2015/000683
§ 371 (c)(1),
(2) Date: Jun. 10, 2016

(87) PCT Pub. No.: WO2015/125450
PCT Pub. Date: Aug. 27, 2015

(65) Prior Publication Data
US 2016/0329584 A1    Nov. 10, 2016

(30) Foreign Application Priority Data
Feb. 18, 2014    (JP) .................................. 2014-028742

(51) Int. Cl.
*H01M 8/04*    (2016.01)
*H01M 8/0432*    (2016.01)
(Continued)

(52) U.S. Cl.
CPC ......... *H01M 8/04373* (2013.01); *C01B 3/382* (2013.01); *H01M 8/04097* (2013.01);
(Continued)

(58) Field of Classification Search
CPC .............. C01B 2203/067; C01B 3/382; C01B 2203/066; H01M 8/04097;
(Continued)

(56) References Cited

U.S. PATENT DOCUMENTS

| | | | |
|---|---|---|---|
| 4,098,960 A * | 7/1978 | Gagnon | H01M 8/0612 429/410 |
| 2013/0071318 A1* | 3/2013 | Higashiyama | B01J 23/002 423/648.1 |

(Continued)

FOREIGN PATENT DOCUMENTS

| | | |
|---|---|---|
| JP | H01-275697 A | 11/1989 |
| JP | 2013-168299 A | 8/2013 |

(Continued)

OTHER PUBLICATIONS

International Search Report and Written Opinion issued in corresponding International Patent Application No. PCT/JP2015/000683, dated Apr. 28, 2015; with partial English translation.

*Primary Examiner* — Mark F. Huff
*Assistant Examiner* — Monique M Wills
(74) *Attorney, Agent, or Firm* — McDermott Will & Emery LLP

(57) ABSTRACT

A fuel cell system includes: a reformer generating a reformed gas using a raw material; a fuel cell generating electric power; a raw material supply passage; a hydro-desulfurizer operative to remove sulfur component in the raw material; a recycle passage through which the reformed gas is supplied to the raw material supply passage provided upstream of the hydro-desulfurizer; a temperature detector (Continued)

detecting a temperature of the hydro-desulfurizer; and a controller, wherein: when the temperature of the hydro-desulfurizer reaches a predetermined temperature, the controller increases a flow rate of the raw material from a predetermined flow rate by a flow rate corresponding to a flow rate of the recycled gas, and then, the controller starts supplying the recycled gas to the recycle passage; and after the recycled gas reaches an upstream end of the recycle passage, the controller returns the flow rate of the raw material to the predetermined flow rate.

14 Claims, 11 Drawing Sheets

(51) Int. Cl.
  *H01M 8/0612* (2016.01)
  *H01M 8/04537* (2016.01)
  *H01M 8/04701* (2016.01)
  *H01M 8/04746* (2016.01)
  *C01B 3/38* (2006.01)
  *H01M 8/0662* (2016.01)
  *H01M 8/04225* (2016.01)
  *H01M 8/04089* (2016.01)
  *H01M 8/04858* (2016.01)

(52) U.S. Cl.
  CPC ... *H01M 8/04225* (2016.02); *H01M 8/04619* (2013.01); *H01M 8/04738* (2013.01); *H01M 8/04776* (2013.01); *H01M 8/04925* (2013.01); *H01M 8/0618* (2013.01); *H01M 8/0675* (2013.01); *C01B 2203/0244* (2013.01); *C01B 2203/0495* (2013.01); *C01B 2203/066* (2013.01); *C01B 2203/067* (2013.01); *C01B 2203/107* (2013.01); *C01B 2203/1058* (2013.01); *C01B 2203/1064* (2013.01); *C01B 2203/127* (2013.01); *C01B 2203/1217* (2013.01); *C01B 2203/1235* (2013.01); *C01B 2203/1241* (2013.01); *C01B 2203/1247* (2013.01); *C01B 2203/1252* (2013.01); *C01B 2203/1288* (2013.01); *C01B 2203/148* (2013.01); *C01B 2203/84* (2013.01)

(58) Field of Classification Search
  CPC ......... H01M 8/04925; H01M 8/04776; H01M 8/04738; H01M 8/0675; H01M 8/04225
  See application file for complete search history.

(56) References Cited

U.S. PATENT DOCUMENTS

| | | |
|---|---|---|
| 2014/0057185 A1 | 2/2014 | Tamura et al. |
| 2014/0072888 A1 | 3/2014 | Harada et al. |
| 2014/0127597 A1 | 5/2014 | Harada et al. |

FOREIGN PATENT DOCUMENTS

| | | |
|---|---|---|
| JP | 2013-224242 A | 10/2013 |
| WO | 2012/164897 A1 | 6/2012 |
| WO | 2013/057891 A1 | 4/2013 |
| WO | 2013/153732 A1 | 10/2013 |

* cited by examiner

FUEL CELL SYSTEM

RELATED APPLICATIONS

This application is the U.S. National Phase under 35 U.S.C. § 371 of International Patent Application No. PCT/JP2015/000683, filed on Feb. 13, 2015, which in turn claims the benefit of Japanese Application No. 2014-028742, filed on Feb. 18, 2014, the disclosures of which Applications are incorporated by reference herein.

TECHNICAL FIELD

The present invention relates to a fuel cell system.

BACKGROUND ART

In recent years, fuel cell systems have been developed and commercialized as distributed power generation systems. An organic compound containing carbon and hydrogen is supplied as a raw material to the fuel cell system. In the fuel cell system, for example, a fuel cell reforms therein the raw material to generate a hydrogen-containing reformed gas, or a reformer provided outside the fuel cell reforms the raw material to generate the reformed gas. When the reformed gas is generated as above, the fuel cell can utilize hydrogen in the reformed gas and oxygen in air supplied from an outside to generate electricity and heat by an electric power generating reaction.

Since the fuel cell system can efficiently generate electric energy and heat energy, it has been expected as an energy supply system effective for reducing carbon dioxide that is a cause of global warming.

Examples of the raw material used in the fuel cell system include a liquefied petroleum gas (LPG), a liquefied natural gas (LNG), a city gas, a shale gas, and methane hydrate. The raw material itself contains a sulfur component, or an odorant added to the raw material contains a sulfur component. When the raw material containing the sulfur component is supplied to an anode of the fuel cell through the reformer and the like, the anode is poisoned by the sulfur component, and this deteriorates a performance of the fuel cell. Further, a reforming catalyst contained in the reformer is poisoned, and this deteriorates a reforming performance. Therefore, the raw material needs to be supplied to the reformer and the anode after the sulfur component in the raw material is reduced to a ppb order or a sub-ppb order.

Therefore, the fuel cell system includes a desulfurizer provided upstream of the reformer and having a function of reducing the sulfur component in the raw material. Examples of a method of removing the sulfur component in the raw material by the desulfurizer include: normal temperature desulfurization in which the sulfur component is physically adsorbed on a catalyst at normal temperature to be removed; and hydrodesulfurization in which the sulfur component is removed by adding hydrogen to the raw material. A hydro-desulfurizer includes a catalyst having an active temperature range that is a predetermined temperature range (for example, about 150 to 350° C.). The hydro-desulfurizer generates hydrogen sulfide from hydrogen and the sulfur component in the raw material supplied from an outside and causes the catalyst to chemically adsorb sulfur in the hydrogen sulfide.

Therefore, when desulfurizing the raw material using the hydro-desulfurizer, hydrogen and the raw material having passed through the hydro-desulfurizer after the hydro-desulfurizer has reached a predetermined temperature (for example, 150° C.) need to be supplied to the reformer and the anode of the fuel cell.

Therefore, when starting up the fuel cell system, the raw material having passed through a normal temperature desulfurizer is supplied to the reformer and the anode of the fuel cell until the hydro-desulfurizer reaches a predetermined temperature (for example, about 180° C.). Thus, the reformer and the fuel cell are warmed up. The raw material having passed through the reformer and the anode of the fuel cell or the reformed gas is combusted together with air supplied to a cathode of the fuel cell, and the hydro-desulfurizer, the reformer, and the fuel cell are heated and warmed up by heat of the combustion and heat of an exhaust gas of the combustion.

If the normal temperature desulfurizer is low in cost and can adsorb and remove the entire sulfur component in the raw material at a ppb order or a sub-ppb order, only the normal temperature desulfurizer may be used, and the hydro-desulfurizer is unnecessary. However, the normal temperature desulfurizer cannot satisfy both of these requirements. On the other hand, the hydro-desulfurizer has a high sulfur component removal performance and is low in cost but needs to be heated and warmed up.

Therefore, during the warm-up of the hydro-desulfurizer, the raw material needs to be desulfurized by normal temperature desulfurization. Thus, both the hydro-desulfurizer and the normal temperature desulfurizer are used in many cases.

One example of the fuel cell system using both the hydro-desulfurizer and the normal temperature desulfurizer is described in PTL 1.

In the fuel cell system of PTL 1, the raw material passes through the normal temperature desulfurizer during the warm-up of the reformer, the fuel cell, and the hydro-desulfurizer. After the warm-up is completed, a flow route of the raw material is switched from a route through which the raw material flows to the normal temperature desulfurizer to a route through which the raw material bypasses the normal temperature desulfurizer and flows to the hydro-desulfurizer. Then, a part of the reformed gas generated by reforming of the raw material returns as a recycled gas to a raw material supply passage provided upstream of the hydro-desulfurizer. With this, the raw material and the hydrogen can be supplied to the hydro-desulfurizer.

CITATION LIST

Patent Literature

PTL 1: Japanese Laid-Open Patent Application Publication No. 1-275697

SUMMARY OF INVENTION

Technical Problem

However, conventional examples do not adequately examine problems caused when starting supplying the recycled gas to the recycle passage after the warm-up of the hydro-desulfurizer is completed.

One aspect of the present invention was made under these circumstances, and an object of the present invention is to provide a fuel cell system capable of more appropriately dealing with the problems caused when starting supplying the recycled gas to the recycle passage after the warm-up of the hydro-desulfurizer is completed, than conventional cases.

Solution to Problem

A fuel cell system according to one aspect of the present invention includes: a reformer operative to generate a reformed gas using a raw material; a fuel cell operative to generate electric power using the reformed gas; a raw material supply passage through which the raw material supplied to the reformer flows; a hydro-desulfurizer operative to remove a sulfur component in the raw material supplied to the reformer; a recycle passage through which a part of the reformed gas is supplied as a recycled gas to the raw material supply passage provided upstream of the hydro-desulfurizer; a temperature detector operative to detect a temperature of the hydro-desulfurizer; and a controller, wherein: when the temperature of the hydro-desulfurizer reaches a predetermined temperature, the controller increases a flow rate of the raw material from a predetermined flow rate by a flow rate corresponding to a flow rate of the recycled gas, and then, the controller starts supplying the recycled gas to the recycle passage; and after the recycled gas reaches an upstream end of the recycle passage through the raw material supply passage, the controller returns the flow rate of the raw material to the predetermined flow rate.

Advantageous Effects of Invention

The fuel cell system according to one aspect of the present invention is configured as explained above and is capable of more appropriately dealing with the problems caused when starting supplying the recycled gas to the recycle passage after the warm-up of the hydro-desulfurizer is completed, than conventional cases.

DESCRIPTION OF EMBODIMENTS

Embodiment 1

Figure 1:
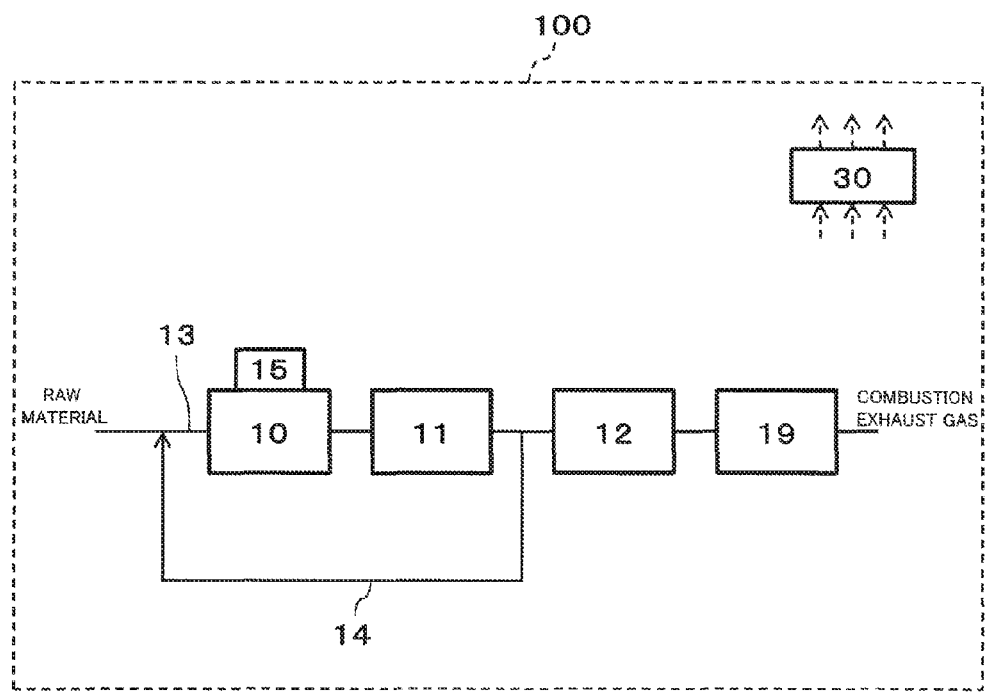
FIG. 1 is a diagram showing one example of a fuel cell system of Embodiment 1.

The present inventors have diligently studied problems caused when starting supplying a recycled gas to a recycle passage after warm-up of a hydro-desulfurizer is completed. As a result, the present inventors have obtained the following findings.

A fuel cell system may adopt a method in which: when the warm-up of the hydro-desulfurizer is slower than the warm-up of a reformer and a fuel cell, the fuel cell starts generating electric power before the completion of the warm-up of the hydro-desulfurizer; and after the completion of the warm-up of the hydro-desulfurizer, a flow route of the raw material is switched from a route through which the raw material flows to the normal temperature desulfurizer to a route through which the raw material bypasses the normal temperature desulfurizer and flows to the hydro-desulfurizer. Further, the fuel cell system may adopt another method in which after the completion of the warm-up of the hydro-desulfurizer, the above switching of the flow route of the raw material is performed, and then, the fuel cell starts generating electric power.

In the latter method, the fuel cell cannot generate electric power until the completion of the warm-up of the hydro-desulfurizer. Therefore, problems are that start-up energy of the system in the latter method is larger than that in the former method, and power generation efficiency of the fuel cell system in the latter method is lower than that in the former method.

To supply hydrogen to the hydro-desulfurizer together with the raw material, as in PTL 1, a part of the reformed gas needs to be supplied as the recycled gas to a raw material supply passage provided upstream of the hydro-desulfurizer. In the former method, when starting supplying the recycled gas to the recycle passage, the flow rate of the reformed gas supplied to the anode of the fuel cell temporarily decreases. Then, for example, a fuel utilization ratio in the anode of the fuel cell increases, and this causes a voltage reduction of the fuel cell. Thus, the reliability and durability of the fuel cell system may deteriorate.

A fuel cell system of Embodiment 1 includes: a reformer operative to generate a reformed gas using a raw material; a fuel cell operative to generate electric power using the reformed gas; a raw material supply passage through which the raw material supplied to the reformer flows; a hydro-desulfurizer operative to remove a sulfur component in the raw material supplied to the reformer; a recycle passage through which a part of the reformed gas is supplied as a recycled gas to the raw material supply passage provided upstream of the hydro-desulfurizer; a temperature detector operative to detect a temperature of the hydro-desulfurizer; and a controller, wherein: when the temperature of the hydro-desulfurizer reaches a predetermined temperature, the controller increases a flow rate of the raw material from a predetermined flow rate by a flow rate corresponding to a flow rate of the recycled gas, and then, the controller starts supplying the recycled gas to the recycle passage; and after the recycled gas reaches an upstream end of the recycle passage through the raw material supply passage, the controller returns the flow rate of the raw material to the predetermined flow rate.

While the fuel cell is generating the electric power, the above predetermined flow rate is a flow rate corresponding to a predetermined electric power generation amount of the fuel cell.

According to this configuration, when starting supplying the recycled gas to the recycle passage in the fuel cell system of the present embodiment, the flow rate of the raw material supplied to the reformer increases by the flow rate corresponding to the flow rate of the recycled gas. Therefore, even if the flow rate of the reformed gas supplied to the anode of the fuel cell temporarily decreases by starting supplying the recycled gas to the recycle passage after the completion of the warm-up of the hydro-desulfurizer, the amount of reformed gas generated can be increased by increasing a flow rate of a reforming reaction gas.

Device Configuration

FIG. 1 is a diagram showing one example of the fuel cell system of Embodiment 1.

In an example shown in FIG. 1, a fuel cell system 100 of the present embodiment includes a hydro-desulfurizer 10, a reformer 11, a fuel cell 12, a raw material supply passage 13, a recycle passage 14, a temperature detector 15, a combustor 19, and a controller 30.

The reformer 11 generates a reformed gas using a raw material. Specifically, a hydrogen-containing reformed gas is generated in the reformer 11 by a reforming reaction of the raw material. The reforming reaction may be any type, and examples thereof include a steam-reforming reaction, an oxidative steam-reforming reaction, an autothermal reaction, and a partial oxidation reaction.

Although not shown in FIG. 1, devices necessary for the respective reforming reactions are suitably provided. For example, when the reforming reaction is the steam-reforming reaction, the oxidative steam-reforming reaction, or the autothermal reaction, a vaporizer that vaporizes water supplied to the reformer and a water supplier that supplies water to the vaporizer are provided. When the reforming reaction is the partial oxidation reaction, the oxidative steam-reforming reaction, or the autothermal reaction, the fuel cell system 100 is provided with an air supplier that supplies air to the reformer. When the oxidative steam-reforming reaction is executed in the reformer 11, the reforming reaction easily proceeds because of heat balance, and the oxidative steam-reforming reaction is more advantageous than the steam-reforming reaction in that the reformer 11 can be reduced in size. Therefore, a configuration in which the oxidative steam-reforming reaction is performed will be explained in Embodiment 2 in detail.

The reformer 11 is configured such that a reforming catalyst is filled in a container. One example of the reforming catalyst is an alumina carrier impregnated with at least one of nickel, ruthenium, platinum, and rhodium. It should be noted that the reforming catalyst is not limited to the above example and may be any material as long as the catalyst can cause the reforming reaction to proceed when the reforming catalyst is maintained within an optimum temperature range.

Examples of the raw material include an organic compound-containing gas, kerosene, and alcohol. Examples of the organic compound-containing gas include a LP gas, a propane gas, a butane gas, and a city gas containing methane as a major component. When using a liquid raw material such as kerosene or alcohol, the liquid raw material may be heated to be vaporized before the supply of the raw material to the reformer 11. The raw material is supplied from a raw material supply source, not shown. The raw material supply source has predetermined supply pressure, and examples thereof include a raw material bomb and a raw material infrastructure.

The fuel cell 12 generates electric power using the reformed gas. Specifically, the reformed gas is supplied from the reformer 11 to an anode of the fuel cell 12, and air is supplied from an outside to a cathode of the fuel cell 12. With this, the fuel cell 12 generates electric power using hydrogen in the reformed gas and oxygen in the air. The electric power generated by the fuel cell 12 is supplied to an external load through a terminal, not shown. Examples of the external load include a home-use electric power consumption device, a business-use electric power consumption device, and a device constituting a wireless base station for mobile phones or the like. It should be noted that the fuel cell 12 is configured such that a plurality of single cells each of which generates electric power by an electric power generating reaction between an anode and a cathode are serially connected to one another.

The fuel cell 12 may be any type, and examples thereof include a polymer electrolyte fuel cell, a solid-oxide fuel cell, and a phosphoric-acid fuel cell. When the fuel cell 12 is the solid-oxide fuel cell, the reformer 11 and the fuel cell 12 may be configured to be incorporated in one container.

The raw material supplied to the reformer 11 flows through the raw material supply passage 13. A suitable raw material supplier and a suitable flow rate detector (both not shown) are disposed on the raw material supply passage 13. The raw material supplier is a device that adjusts the flow rate of the raw material supplied to the reformer 11. For example, the raw material supplier is constituted by a booster and a flow rate control valve but may be constituted by any one of them. The booster is, for example, a fixed displacement pump but is not limited to this.

The hydro-desulfurizer 10 removes the sulfur component in the raw material supplied to the reformer 11. The hydro-desulfurizer 10 is configured such that a hydrodesulfurizing agent is filled in a container. One example of the hydrodesulfurizing agent is a CuZn-based catalyst having both a function of converting the sulfur component into hydrogen sulfide and a function of adsorbing the hydrogen sulfide. The hydrodesulfurizing agent is not limited to this example and may be constituted by: a CoMo-based catalyst that converts the sulfur component in the raw material into the hydrogen sulfide; and a ZnO-based catalyst or CuZn-based catalyst that is a sulfur adsorbent provided downstream of the CoMo-based catalyst and adsorbing and removing the hydrogen sulfide.

When the hydrodesulfurizing agent contains copper and zinc, an appropriate operating temperature range of the hydro-desulfurizer 10 is about 150 to 350° C.

The recycle passage 14 is a passage through which a part of the reformed gas is supplied as the recycled gas to the raw material supply passage 13 provided upstream of the hydro-desulfurizer 10. An upstream end of the recycle passage 14 may be connected to any passage as long as the passage is a passage through which a hydrogen-containing gas output from the reformer 11 flows. Although not shown in FIG. 1, devices necessary at the recycle passage 14 are suitably provided. For example, a booster, an on-off valve, a condenser, and the like may be provided on the recycle passage 14. One example of the booster is a fixed displacement pump, and the fixed displacement pump increases the pressure of the recycled gas flowing through the recycle passage to adjust the flow rate of the recycled gas. One example of the condenser is a heat exchanger, and the heat exchanger condenses steam in the recycled gas by heat exchange to remove the steam from the recycled gas.

The temperature detector 15 detects a temperature of the hydro-desulfurizer 10. The temperature detector 15 may have any configuration as long as it can directly or indirectly detect the temperature of the hydro-desulfurizer 10. To be specific, the temperature detector 15 may be provided in the hydro-desulfurizer 10 to directly detect the temperature of the hydro-desulfurizer 10, or the temperature detector 15 may be provided at a predetermined portion (for example, a pipe constituting the raw material supply passage 13 or the reformer 11) correlated to the temperature of the hydro-desulfurizer 10 to indirectly detect the temperature of the hydro-desulfurizer 10. In the present embodiment, the temperature detector 15 is provided in the hydro-desulfurizer 10. Examples of the temperature detector 15 include a thermocouple and a thermistor.

The hydrodesulfurizing agent may contain nickel (Ni) as catalyst metal. In this case, when the hydro-desulfurizer 10 is low in temperature (for example, less than 150° C.) before the warm-up, a nickel carbonyl gas may be generated by supplying the raw material and the recycled gas to the hydrodesulfurizing agent. However, in the present embodiment, since the temperature of the hydrodesulfurizing agent in the hydro-desulfurizer 10 is detected using the temperature detector 15, the generation of the nickel carbonyl gas can be appropriately avoided.

The combustor 19 combusts the reformed gas containing hydrogen. A fuel of the combustor 19 may be any fuel. For example, an anode off gas discharged from the fuel cell 12 may be used as a combustion fuel. In this case, the anode off gas is supplied from the anode of the fuel cell 12 to the combustor 19, and a cathode off gas is supplied from the cathode of the fuel cell 12 to the combustor 19. A combustion exhaust gas is generated by the combustion of the anode off gas and the cathode off gas, and the hydro-desulfurizer 10, the reformer 11, and the like are heated by the combustion heat of the combustor 19 and the heat of the combustion exhaust gas.

When the temperature of the hydro-desulfurizer 10 reaches a predetermined temperature, the controller 30 increases the flow rate of the raw material, supplied to the reformer 11, from a predetermined flow rate by a flow rate corresponding to a flow rate of the recycled gas, and then, the controller 30 starts supplying the recycled gas to the recycle passage 14. After the recycled gas reaches an upstream end of the recycle passage 14 through the raw material supply passage 13, the controller 30 returns the flow rate of the raw material to the predetermined flow rate.

The controller 30 may have any configuration as long as it has a control function. For example, the controller 30 includes a calculation processing portion and a storage portion storing a control program. Examples of the calculation processing portion include an MPU and a CPU. One example of the storage portion is a memory. The controller 30 may be constituted by a single controller that performs centralized control or may be constituted by a plurality of controllers that cooperate to perform distributed control.

As above, according to the fuel cell system 100 of the present embodiment, when starting supplying the recycled gas to the recycle passage 14, the flow rate of the raw material supplied to the reformer 11 is increased by the flow rate corresponding to the flow rate of the recycled gas. Therefore, even if the flow rate of the reformed gas supplied to the anode of the fuel cell 12 temporarily decreases by starting supplying the recycled gas to the recycle passage 14 after the completion of the warm-up of the hydro-desulfurizer 10, the amount of reformed gas generated can be increased by increasing the flow rate of the reforming reaction gas.

Embodiment 2

The fuel cell system of Embodiment 2 is configured such that the fuel cell system of Embodiment 1 includes: a vaporizer operative to vaporize water supplied to the reformer; and a water supplier operative to supply the water to the vaporizer, wherein: the reformer generates the reformed gas using steam and the raw material; when the temperature of the hydro-desulfurizer reaches the predetermined temperature, the controller increases a flow rate of the water from a predetermined flow rate by a flow rate corresponding to the flow rate of the recycled gas, and then, the controller starts supplying the recycled gas to the recycle passage; and after the recycled gas reaches the upstream end of the recycle passage through the raw material supply passage, the controller returns the flow rate of the water to the predetermined flow rate.

While the fuel cell is generating the electric power, the predetermined flow rate is a flow rate corresponding to a predetermined electric power generation amount of the fuel cell.

According to this configuration, when starting supplying the recycled gas to the recycle passage in the fuel cell system of the present embodiment, the flow rate of the water supplied to the reformer is increased by the flow rate corresponding to the flow rate of the recycled gas. Therefore, even if the flow rate of the reformed gas supplied to the anode of the fuel cell temporarily decreases by starting supplying the recycled gas to the recycle passage after the completion of the warm-up of the hydro-desulfurizer, the amount of reformed gas generated can be increased by increasing the flow rate of the reforming reaction gas.

Except for the above features, the fuel cell system of the present embodiment may be the same in configuration as the fuel cell system of Embodiment 1.

Device Configuration

Figure 2:
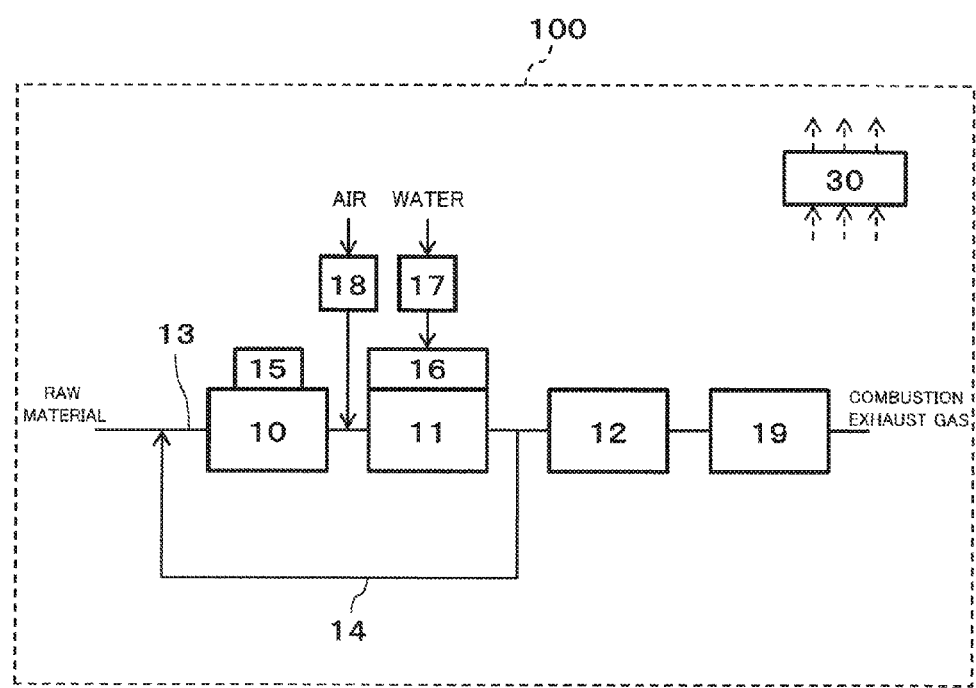
FIG. 2 is a diagram showing one example of the fuel cell system of Embodiment 2.

FIG. 2 is a diagram showing one example of the fuel cell system of Embodiment 2.

In the example shown in FIG. 2, the fuel cell system 100 of the present embodiment includes the hydro-desulfurizer 10, the reformer 11, the fuel cell 12, the raw material supply passage 13, the recycle passage 14, the temperature detector 15, a vaporizer 16, a water supplier 17, an air supplier 18, the combustor 19, and the controller 30.

Since the hydro-desulfurizer 10, the fuel cell 12, the raw material supply passage 13, the temperature detector 15, the combustor 19, and the recycle passage 14 are the same as those in Embodiment 1, explanations thereof are omitted.

The vaporizer 16 vaporizes water supplied to the reformer 11. The vaporizer 16 may have any configuration as long as it can vaporize water supplied to the reformer 11. One example of the vaporizer 16 is a heat exchanger capable of vaporizing water by heat exchange with a high-temperature heating fluid.

The water supplier 17 supplies water to the vaporizer 16. The water supplier 17 may have any configuration as long as it can supply water to the vaporizer 16. The water supplier 17 is a device that adjusts the flow rate of the water for the reforming reaction supplied to the vaporizer 16. For example, the water supplier 17 is constituted by a booster and a flow rate control valve. The booster is, for example, a fixed displacement pump but is not limited to this. A suitable flow rate detector is disposed on a passage through which the water is supplied from the water supplier 17 to the vaporizer 16.

The air supplier 18 supplies air to the reformer 11. The air supplier 18 may have any configuration as long as it can supply air to the reformer 11. The air supplier 18 is a device that adjusts the flow rate of the air for the reforming reaction supplied to the reformer 11. For example, the air supplier 18 is constituted by a booster and a flow rate control valve. The booster is, for example, a fixed displacement pump but is not limited to this.

Thus, the reformer 11 generates the reformed gas using the steam and the raw material. In the present embodiment, the steam, the air, and the raw material are supplied to the reformer 11, and the oxidative steam-reforming reaction is performed in the reformer 11.

When the temperature of the hydro-desulfurizer 10 reaches the predetermined temperature, the controller 30 increases the flow rate of the water, supplied to the reformer 11, from a predetermined flow rate by a flow rate corresponding to the flow rate of the recycled gas, and then, the controller 30 starts supplying the recycled gas to the recycle passage. After the recycled gas reaches the upstream end of the recycle passage through the raw material supply passage, the controller 30 returns the flow rate of the water to the predetermined flow rate.

As above, according to the fuel cell system 100 of the present embodiment, when starting supplying the recycled gas to the recycle passage 14, the flow rate of the water supplied to the reformer 11 is increased by the flow rate corresponding to the flow rate of the recycled gas. Therefore, even if the flow rate of the reformed gas supplied to the anode of the fuel cell 12 temporarily decreases by starting supplying the recycled gas to the recycle passage 14 after the completion of the warm-up of the hydro-desulfurizer 10, the amount of reformed gas generated can be increased by increasing the flow rate of the reforming reaction gas.

When the partial oxidation reaction is performed in the reformer 11, the steam is not supplied to the reformer 11. Therefore, the flow rate of the air supplied to the reformer 11 may be adjusted instead of the adjustment of the flow rate of the water.

Example 1

Device Configuration

The fuel cell system 100 of Example 1 is the same in configuration as the fuel cell system 100 shown in FIG. 1 or 2. Since Example 1 is the same in configuration as Embodiment 1 or 2, an explanation of the configuration thereof is omitted.

Operations

Figure 3:
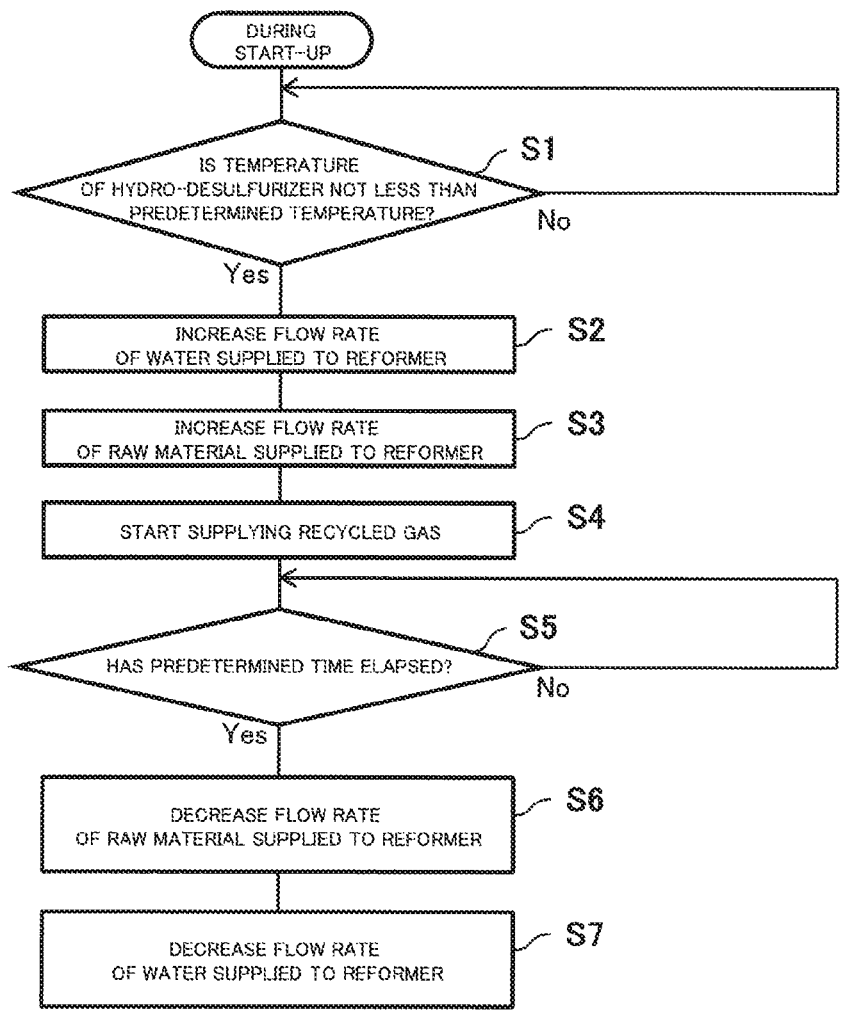
FIG. 3 is a flow chart showing one example of operations of the fuel cell system of Example 1 of Embodiment 2.

FIG. 3 is a flow chart showing one example of operations of the fuel cell system of Example 1 of Embodiment 2. The following operations are performed by the control program of the controller 30.

Example 1 explains an example in which the supply of the recycled gas to the recycle passage 14 is started in a case where the warm-up of the hydro-desulfurizer 10 is faster than the warm-up of the reformer 11 and the warm-up of the fuel cell 12, for example, while the fuel cell system 100 is starting up and before the electric power generation of the fuel cell 12 is started.

First, whether or not the temperature of the hydro-desulfurizer 10 is not less than the predetermined temperature is determined in Step S1. For example, when the hydrodesulfurizing agent contains copper and zinc, an appropriate operating temperature range of the hydro-desulfurizer 10 is about 150 to 350° C. Therefore, in this case, the predetermined temperature in Step S1 is set to, for example, 180° C.

When the temperature of the hydro-desulfurizer 10 is less than the predetermined temperature, the flow rate of the reforming water supplied to the reformer 11 and the flow rate of the raw material supplied to the reformer 11 are maintained without change.

When the temperature of the hydro-desulfurizer 10 reaches the predetermined temperature, the process proceeds to the next step. In Step S2, the flow rate of the reforming water supplied to the reformer 11 is increased from a predetermined reforming water flow rate by a flow rate corresponding to the flow rate of the recycled gas. Further, in Step S3, the flow rate of the raw material supplied to the reformer 11 is increased from a predetermined raw material flow rate by a flow rate corresponding to the flow rate of the recycled gas.

For example, the predetermined raw material flow rate is 2.1 NL/min. The recycled gas is supplied such that the amount thereof corresponds to 10% (a range of 2.5 to 20%) of the amount of reformed gas. Therefore, the raw material flow rate is increased by a reforming raw material flow rate of about 0.21 NL/min that is 10% of the predetermined raw material flow rate. In accordance with this, when the predetermined reforming water flow rate is 4.9 cc/min (for example, an amount corresponding to "S/C=2.5"), the reforming water flow rate is increased by 10% (0.49 cc/min) of the predetermined reforming water flow rate.

Then, in Step S4, the supply of the recycled gas to the recycle passage 14 is started. With this, hydrogen can be added to the raw material flowing toward the hydro-desulfurizer 10. Therefore, the hydro-desulfurizer 10 can perform hydrodesulfurization of the raw material by utilizing the hydrogen.

The above operations in Steps S2 to S4 are performed because of the following reasons.

When starting supplying the recycled gas to the recycle passage 14, a part of the reformed gas returns from the upstream end of the recycle passage 14 to the hydro-desulfurizer 10, and in accordance with this, the flow rate of the reformed gas supplied to the anode of the fuel cell 12 temporarily decreases. With this, the flow rate of the anode off gas discharged from the fuel cell 12 also temporarily decreases. Therefore, the amount of anode off gas supplied from the fuel cell 12 to the combustor 19 decreases, and an optimal flow rate ratio for the combustion of the anode off gas and the cathode off gas discharged from the cathode of the fuel cell 12 is not realized. On this account, there is a possibility that combustibility of the combustor 19 deteriorates. There is another possibility that the concentration of carbon monoxide in the combustion exhaust gas of the combustor 19 increases, and misfire of the combustor 19 occurs.

In the present embodiment, as described above, the flow rate of the reforming water supplied to the reformer 11 is increased from the predetermined reforming water flow rate by the flow rate corresponding to the flow rate of the recycled gas. Further, the flow rate of the raw material supplied to the reformer 11 is increased from the predetermined raw material flow rate by the flow rate corresponding to the flow rate of the recycled gas. After that, the supply of the recycled gas to the recycle passage 14 is started. Therefore, when starting supplying the recycled gas to the recycle passage 14, the amount of reformed gas generated by the reformer 11 increases, and with this, the amount of reformed gas supplied from the reformer 11 to the fuel cell 12 increases. On this account, the decrease in the amount of anode off gas supplied to the combustor 19 is suppressed as compared to conventional cases. Thus, it is possible to reduce the possibilities of: the deterioration of the combustibility of the combustor 19; the increase in the concentration of carbon monoxide in the combustion exhaust gas of the combustor 19; and the misfire of the combustor 19. As a result, the fuel cell system 100 can be stably operated.

Next, whether or not a predetermined time has been elapsed since the start of the supply of the recycled gas to the recycle passage 14 is determined in Step S5.

This predetermined time is set to, for example, a time in which the recycled gas is assumed to flow through the recycle passage 14 and the raw material supply passage 13 to reach the upstream end of the recycle passage 14. The predetermined time can be calculated based on, for example, the flow rate of the recycled gas, the cross-sectional areas of the recycle passage 14 and the raw material supply passage 13, and a length from the upstream end of the recycle passage 14 through the raw material supply passage 13 back to the upstream end of the recycle passage 14.

Until the predetermined time in Step S5 elapses, the flow rate of the reforming water supplied to the reformer 11 and the flow rate of the raw material supplied to the reformer 11 are maintained without change.

When the predetermined time in Step S5 has elapsed, the process proceeds to the next step. In Step S6, the flow rate of the raw material supplied to the reformer 11 is reduced so as to return to the predetermined raw material flow rate. Further, in Step S7, the flow rate of the reforming water supplied to the reformer 11 is reduced so as to return to the predetermined reforming water flow rate.

For example, in the above case, although the flow rate of the reforming water supplied to the reformer 11 is increased from the predetermined reforming water flow rate by 0.49 g/min, it is returned to the predetermined reforming water flow rate that is the flow rate before the flow rate of the reforming water supplied to the reformer 11 is increased. Further, although the flow rate of the raw material supplied to the reformer 11 is increased from the predetermined raw material flow rate by 0.21 NL/min, it is returned to the predetermined raw material flow rate (2.1 L/min) that is the flow rate before the flow rate of the raw material supplied to the reformer 11 is increased.

The above operations in Steps S6 and S7 are performed because of the following reasons.

After the elapse of the time in which the recycled gas is assumed to flow through the recycle passage 14 and the raw material supply passage 13 to reach the upstream end of the recycle passage 14, it can be determined that the temporal decrease in the flow rate of the reformed gas supplied to the anode of the fuel cell 12 has been resolved. Therefore, in this case, the flow rate of the raw material supplied to the reformer 11 can be reduced so as to return to the predetermined raw material flow rate, and the flow rate of the reforming water supplied to the reformer 11 can be reduced so as to return to the predetermined reforming water flow rate.

It should be noted that the temperature of the hydro-desulfurizer 10 in Step S1 and the method of calculating the predetermined time in Step S5 are just examples and are not limited to these examples.

Example 2

Device Configuration

The fuel cell system 100 in Example 2 is the same in configuration as the fuel cell system shown in FIG. 1 or 2. Since Example 2 is the same in configuration as Embodiment 1 or 2, an explanation of the configuration thereof is omitted.

Operations

Figure 4:
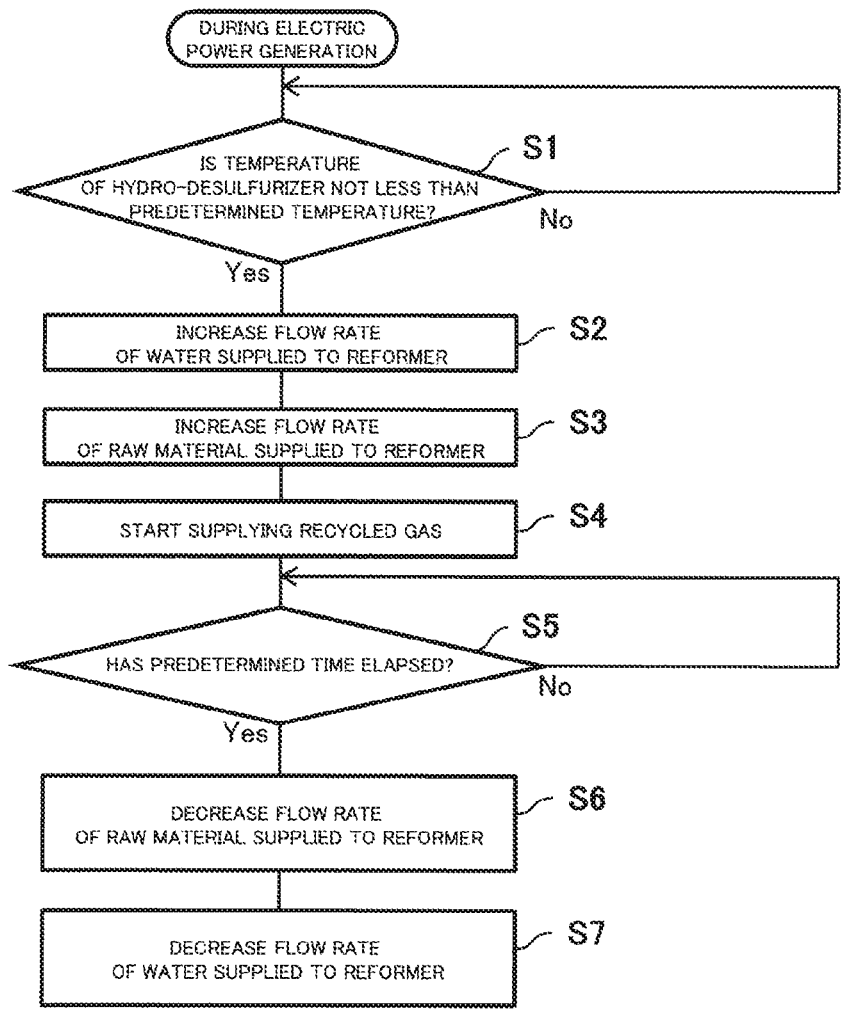
FIG. 4 is a flow chart showing one example of operations of the fuel cell system of Example 2 of Embodiment 2.

FIG. 4 is a flow chart showing one example of operations of the fuel cell system of Example 2 of Embodiment 2. The following operations are performed by the control program of the controller 30.

Example 2 explains an example in which the supply of the recycled gas to the recycle passage 14 is started in a case where the warm-up of the hydro-desulfurizer 10 is slower than the warm-up of the reformer 11 and the fuel cell 12, for example, in a case where the fuel cell system 100 is generating electric power and a rated operation of the fuel cell 12 is performed.

First, whether or not the temperature of the hydro-desulfurizer 10 is not less than the predetermined temperature is determined in Step S1. For example, when the hydrodesulfurizing agent contains copper and zinc, an appropriate operating temperature range of the hydro-desulfurizer 10 is about 150 to 350° C. Therefore, in this case, the predetermined temperature in Step S1 is set to, for example, 180° C.

When the temperature of the hydro-desulfurizer 10 is less than the predetermined temperature, the flow rate of the reforming water supplied to the reformer 11 and the flow rate of the raw material supplied to the reformer 11 are maintained without change.

When the temperature of the hydro-desulfurizer 10 reaches the predetermined temperature, the process proceeds to the next step. In Step S2, the flow rate of the reforming water supplied to the reformer 11 is increased by the flow rate corresponding to the flow rate of the recycled gas from the reforming water flow rate corresponding to the predetermined electric power generation amount of the fuel cell 12. Further, in Step S3, the flow rate of the raw material supplied to the reformer 11 is increased by the flow rate corresponding to the flow rate of the recycled gas from the raw material flow rate corresponding to the predetermined electric power generation amount of the fuel cell 12.

Then, in Step S4, the supply of the recycled gas to the recycle passage 14 is started. With this, hydrogen can be added to the raw material flowing toward the hydro-desulfurizer 10. As a result, the hydro-desulfurizer 10 can perform hydrodesulfurization of the raw material by utilizing the hydrogen.

The above operations in Steps S2 to S4 are performed because of the following reasons in addition to the reasons explained in Example 1.

When starting supplying the recycled gas to the recycle passage 14, a part of the reformed gas returns from the upstream end of the recycle passage 14 to the hydro-desulfurizer 10, and in accordance with this, the flow rate of the reformed gas supplied to the anode of the fuel cell 12 temporarily decreases. With this, the fuel utilization ratio in the anode of the fuel cell 12 increases. Thus, the fuel necessary for the reaction lacks, or a fuel gas diffusion rate-determining control state is caused at the anode. As a result, an overvoltage (an electrode reaction resistance of the fuel cell 12) increases, and a voltage reduction is caused at the fuel cell 12. In such a situation, if the fuel utilization ratio in the fuel cell 12 further increases, nickel that is a material of the anode may be oxidized. At this time, since the anode expands, and stress is generated on the anode, the anode may be damaged. After that, when the fuel gas diffusion rate-determining control state returns to a normal operation state, nickel oxide is reduced to nickel. If such expansion and contraction of the anode are repeated, stress repeatedly acts on the anode, and the damage of the anode may proceed. It is thought that the durability of the anode decreases as above.

In the present embodiment, as described above, the flow rate of the reforming water supplied to the reformer 11 is increased by the flow rate corresponding to the flow rate of the recycled gas from the reforming water flow rate corresponding to the predetermined electric power generation amount of the fuel cell 12. Further, the flow rate of the raw material supplied to the reformer 11 is increased by the flow rate corresponding to the flow rate of the recycled gas from the raw material flow rate corresponding to the predetermined electric power generation amount of the fuel cell 12. After that, the supply of the recycled gas to the recycle passage 14 is started. Therefore, when starting supplying the recycled gas to the recycle passage 14, the amount of reformed gas generated by the reformer 11 increases, and with this, the amount of reformed gas supplied from the reformer 11 to the fuel cell 12 increases. On this account, the increase in the fuel utilization ratio in the anode of the fuel cell 12 can be suppressed, so that the voltage reduction at the fuel cell 12 can be suppressed and the possibility of the progress of the damage of the anode can be reduced as compared to conventional cases.

Next, whether or not a predetermined time has been elapsed since the start of the supply of the recycled gas to the recycle passage 14 is determined in Step S5.

This predetermined time is set to, for example, a time in which the recycled gas is assumed to flow through the recycle passage 14 and the raw material supply passage 13 to reach the upstream end of the recycle passage 14. The predetermined time can be calculated based on, for example, the flow rate of the recycled gas, the cross-sectional areas of the recycle passage 14 and the raw material supply passage 13, and a length from the upstream end of the recycle passage 14 through the raw material supply passage 13 back to the upstream end of the recycle gas passage 14.

Until the predetermined time in Step S5 elapses, the flow rate of the reforming water supplied to the reformer 11 and the flow rate of the raw material supplied to the reformer 11 are maintained without change.

When the predetermined time in Step S5 has elapsed, the process proceeds to the next step. In Step S6, the flow rate of the raw material supplied to the reformer 11 is reduced so as to return to the raw material flow rate corresponding to the above electric power generation amount. Further, in Step S7, the flow rate of the reforming water supplied to the reformer 11 is reduced so as to return to the reforming water flow rate corresponding to the above electric power generation amount.

The above operations in Steps S6 and S7 are performed because of the following reasons.

After the elapse of the time in which the recycled gas is assumed to flow through the recycle passage 14 and the raw material supply passage 13 to reach the upstream end of the recycle passage 14, it can be determined that the temporal decrease in the flow rate of the reformed gas supplied to the anode of the fuel cell 12 has been resolved. Therefore, in this case, the flow rate of the raw material supplied to the reformer 11 can be reduced so as to return to the raw material flow rate corresponding to the above electric power generation amount, and the flow rate of the reforming water supplied to the reformer 11 can be reduced so as to return to the reforming water flow rate corresponding to the above electric power generation amount.

It should be noted that the temperature of the hydro-desulfurizer 10 in Step S1 and the method of calculating the predetermined time in Step S5 are just examples and are not limited to these examples.

Embodiment 3

The fuel cell system of Embodiment 3 includes: a reformer operative to generate a reformed gas using a raw material; a fuel cell operative to generate electric power using the reformed gas; a raw material supply passage through which the raw material supplied to the reformer flows; a hydro-desulfurizer operative to remove a sulfur component in the raw material supplied to the reformer; a recycle passage through which a part of the reformed gas is supplied as a recycled gas to the raw material supply passage provided upstream of the hydro-desulfurizer; a temperature detector operative to detect a temperature of the hydro-desulfurizer; and a controller, wherein: while the fuel cell is generating the electric power and before the temperature of the hydro-desulfurizer reaches a predetermined temperature, the controller keeps an electric power generation amount of the fuel cell to be equal to or less than power consumption necessary for driving the fuel cell system such that the electric power is not supplied to an external load; and after the recycled gas reaches an upstream end of the recycle passage through the raw material supply passage, the controller returns the electric power generation amount of the fuel cell to such an amount that supply of the electric power to the external load is realized.

In the operations of the fuel cell system, when the electric power generation amount of the fuel cell is equal to or less than the power consumption necessary for driving the fuel cell system, the fuel utilization ratio is controlled to become low for maintaining the temperature of the fuel cell. Therefore, in the present embodiment, when starting supplying the recycled gas to the recycle passage, the operations of the fuel cell system are maintained such that the electric power generation amount of the fuel cell is equal to or less than the power consumption necessary for driving the fuel cell system, and with this, the increase in the fuel utilization ratio in the fuel cell can be suppressed within an allowable range.

It should be noted that the above features of the fuel cell system of the present embodiment may be combined with the features of the fuel cell system of Embodiment 1 or 2.

Device Configuration

The fuel cell system 100 of the present embodiment is the same in configuration as the fuel cell system 100 shown in FIG. 1 or 2. Since the present embodiment is the same in configuration as Embodiment 1 or 2, an explanation of the configuration thereof is omitted.

Operations

Figure 5:
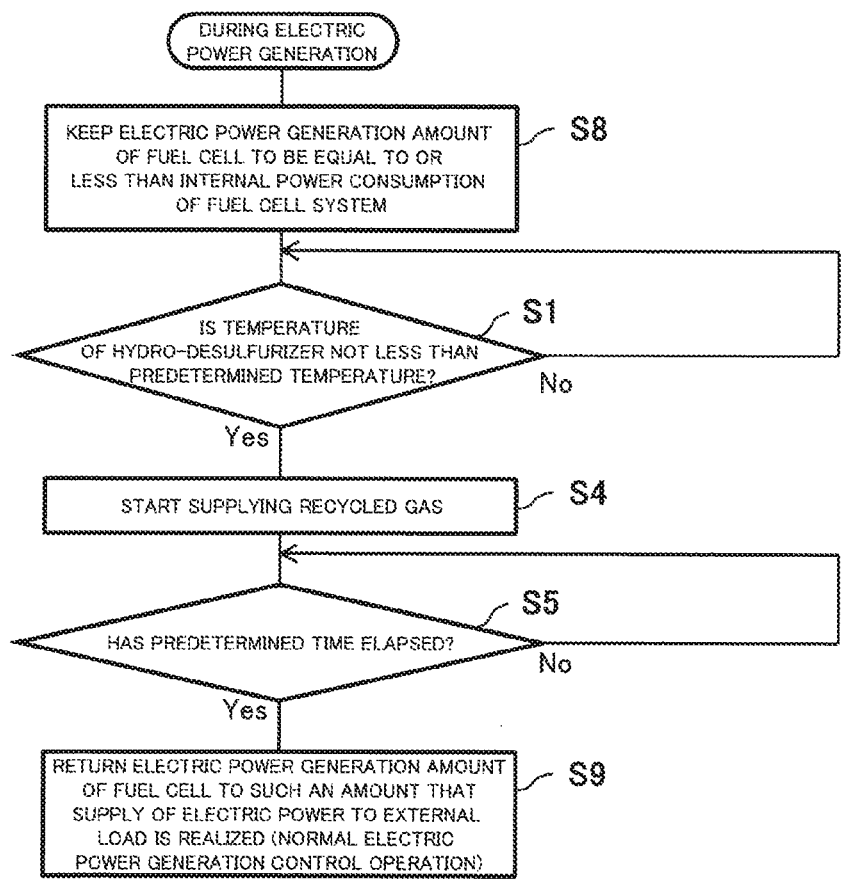
FIG. 5 is a flow chart showing one example of operations of the fuel cell system of Embodiment 3.

FIG. 5 is a flow chart showing one example of operations of the fuel cell system of Embodiment 3. The following operations are performed by the control program of the controller 30.

The present embodiment explains an example in which the supply of the recycled gas to the recycle passage 14 is started in a case where the warm-up of the hydro-desulfurizer 10 is slower than the warm-up of the reformer 11 and the fuel cell 12, for example, in a case where the fuel cell system 100 is generating electric power and the rated operation of the fuel cell 12 is performed.

First, before the temperature of the hydro-desulfurizer 10 reaches the predetermined temperature (i.e., before the warm-up of the hydro-desulfurizer 10 is completed), the electric power generation amount of the fuel cell 12 is controlled in Step S8 to be maintained so as to be equal to or less than the power consumption necessary for driving the fuel cell system 100 such that electric power is not supplied to the external load. After the recycled gas reaches the upstream end of the recycle passage 14 through the raw material supply passage 13, the electric power generation amount of the fuel cell 12 is controlled in Step S9 to return to such an amount that electric power can be supplied to the external load.

Since the operations in Steps S1, S4, and S5 of the present embodiment are the same as the operations in Steps S1, S4, and S5 of Embodiment 2, explanations thereof are omitted.

In the operations of the fuel cell system 100, when the electric power generation amount of the fuel cell 12 is equal to or less than the power consumption necessary for driving the fuel cell system 100, the fuel utilization ratio is controlled to become low for maintaining the temperature of the fuel cell 12. Therefore, in the present embodiment, when starting supplying the recycled gas to the recycle passage 14, the operations of the fuel cell system 100 are maintained such that the electric power generation amount of the fuel cell 12 is equal to or less than the power consumption necessary for driving the fuel cell system 100, and with this, the increase in the fuel utilization ratio in the fuel cell 12 can be suppressed within an allowable range.

It should be noted that the operations of the present embodiment may be combined with the operations of Embodiment 1, the operations of Example 1 of Embodiment 2, or the operations of Example 2 of Embodiment 2. For example, Steps S2 and S3 in FIG. 3 or 4 may be performed between Steps S1 and S4 in FIG. 5, and Steps S6 and S7 in FIG. 3 or 4 may be performed between Steps S5 and S9 in FIG. 5. With this, in the present embodiment, the decrease in the amount of anode off gas supplied to the combustor 19 is suppressed as with Example 1 of Embodiment 2. Thus, it is possible to reduce the possibilities of: the deterioration of the combustibility of the combustor 19; the increase in the concentration of carbon monoxide in the combustion exhaust gas of the combustor 19; and the misfire of the combustor 19. Further, as with Example 2 of Embodiment 2, the voltage reduction at the fuel cell 12 is suppressed, and the possibility of the progress of the damage of the anode can be reduced.

Embodiment 4

The fuel cell system of Embodiment 4 includes: a reformer operative to generate a reformed gas using a raw material; a fuel cell operative to generate electric power using the reformed gas; a raw material supply passage through which the raw material supplied to the reformer flows; a hydro-desulfurizer operative to remove a sulfur component in the raw material supplied to the reformer; a recycle passage through which a part of the reformed gas is supplied as a recycled gas to the raw material supply passage provided upstream of the hydro-desulfurizer; a temperature detector operative to detect a temperature of the hydro-desulfurizer; and a controller, wherein while the fuel cell is generating the electric power and before the temperature of the hydro-desulfurizer reaches a predetermined temperature, the controller keeps an electric power generation amount of the fuel cell to be less than an output of a rated operation of the fuel cell system; and after the recycled gas reaches an upstream end of the recycle passage through the raw material supply passage, the controller returns the electric power generation amount of the fuel cell to such an amount that the output of the rated operation of the fuel cell system is realized.

In a low-output operation of the fuel cell system, the fuel utilization ratio in the fuel cell is controlled to be lower than that in the rated operation of the fuel cell system. Therefore, in the present embodiment, when starting supplying the recycled gas to the recycle passage, the low-output operation of the fuel cell system is maintained, and with this, the increase in the fuel utilization ratio in the fuel cell can be suppressed within an allowable range.

It should be noted that the above features of the fuel cell system of the present embodiment may be combined with the features of the fuel cell system of Embodiment 1 or 2.

Device Configuration

The fuel cell system 100 of the present embodiment is the same in configuration as the fuel cell system 100 shown in FIG. 1 or 2. Since the present embodiment is the same in configuration as Embodiment 1 or 2, an explanation thereof is omitted.

Operations

Figure 6:
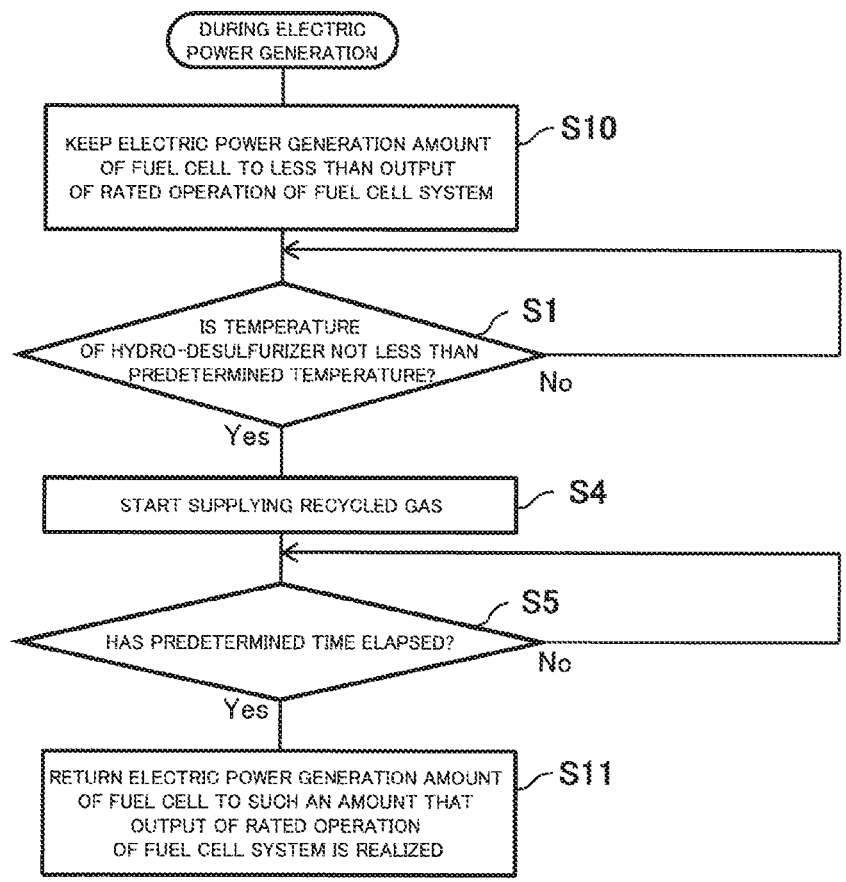
FIG. 6 is a flow chart showing one example of operations of the fuel cell system of Embodiment 4.

FIG. 6 is a flow chart showing one example of operations of the fuel cell system of Embodiment 4. The following operations are performed by the control program of the controller 30.

The present embodiment explains an example in which the supply of the recycled gas to the recycle passage 14 is started in a case where the warm-up of the hydro-desulfurizer 10 is slower than the warm-up of the reformer 11 and the fuel cell 12, for example, in a case where the fuel cell system 100 is generating electric power and the operation of increasing the electric power generation amount when starting up the fuel cell system 100 is performed.

First, before the temperature of the hydro-desulfurizer 10 reaches the predetermined temperature (i.e., before the warm-up of the hydro-desulfurizer 10 is completed), the electric power generation amount of the fuel cell 12 is controlled in Step S10 to be maintained to be lower than the output of the rated operation of the fuel cell system 100. For example, the electric power generation amount of the fuel cell 12 is controlled to be limited to not more than an amount (for example, 200 W) lower than the output (for example, 700 W) of the rated operation of the fuel cell system 100. After the recycled gas reaches the upstream end of the recycle passage 14 through the raw material supply passage 13, the electric power generation amount of the fuel cell 12 is controlled in Step S11 to return to such an amount that the output of the rated operation of the fuel cell system 100 is realized. For example, the above limitation to the electric power generation amount of the fuel cell 12 is canceled, and the control operations for realizing the output (for example, 700 W) of the above normal rated operation of the fuel cell system 100 are performed.

Since the operations in Steps S1, S4, and S5 of the present embodiment are the same as the operations in Steps S1, S4, and S5 of Embodiment 2, explanations thereof are omitted.

In the low-output operation of the fuel cell system 100, the fuel utilization ratio in the fuel cell 12 is controlled to be lower than that in the rated operation of the fuel cell system 100. Therefore, in the present embodiment, when starting supplying the recycled gas to the recycle passage 14, the low-output operation of the fuel cell system 100 is maintained, and with this, the increase in the fuel utilization ratio in the fuel cell 12 can be suppressed within an allowable range.

It should be noted that the operations of the present embodiment may be combined with the operations of Embodiment 1, the operations of Example 1 of Embodiment 2, or the operations of Example 2 of Embodiment 2. For example, Steps S2 and S3 in FIG. 3 or 4 may be performed between Steps S1 and S4 in FIG. 6, and Steps S6 and S7 in FIG. 3 or 4 may be performed between Steps S5 and S11 in FIG. 6. With this, in the present embodiment, the decrease in the amount of anode off gas supplied to the combustor 19 is suppressed as with Example 1 of Embodiment 2. Thus, it is possible to reduce the possibilities of: the deterioration of the combustibility of the combustor 19; the increase in the concentration of carbon monoxide in the combustion exhaust gas of the combustor 19; and the misfire of the combustor 19. Further, as with Example 2 of Embodiment 2, the voltage reduction at the fuel cell 12 is suppressed, and the possibility of the progress of the damage of the anode can be reduced.

The electric power generation amounts of the fuel cell 12 in Steps S10 and S11 are just examples and are not limited to these examples.

Embodiment 5

The fuel cell system of Embodiment 5 includes: a reformer operative to generate a reformed gas using a raw material; a fuel cell operative to generate electric power using the reformed gas; a raw material supply passage through which the raw material supplied to the reformer flows; a hydro-desulfurizer operative to remove a sulfur component in the raw material supplied to the reformer; a recycle passage through which a part of the reformed gas is supplied as a recycled gas to the raw material supply passage provided upstream of the hydro-desulfurizer; a temperature detector operative to detect a temperature of the hydro-desulfurizer; and a controller, wherein: while the fuel cell is generating the electric power and before the temperature of the hydro-desulfurizer reaches a predetermined temperature, the controller makes an increasing speed of an electric power generation amount of the fuel cell lower than a predetermined increasing speed; and after the recycled gas reaches an upstream end of the recycle passage through the raw material supply passage, the controller returns the increasing speed of the electric power generation amount of the fuel cell to the predetermined increasing speed.

According to this configuration, when starting supplying the recycled gas to the recycle passage, the increasing speed of the electric power generation amount of the fuel cell is made low, and with this, the reaction of the fuel in the anode of the fuel cell can be suppressed. Thus, the increase in the fuel utilization ratio in the fuel cell can be suppressed within an allowable range.

It should be noted that the above features of the fuel cell system of the present embodiment may be combined with the features of the fuel cell system of Embodiment 1 or 2.

Device Configuration

The fuel cell system 100 of the present embodiment is the same in configuration as the fuel cell system 100 shown in FIG. 1 or 2. Since the present embodiment is the same in configuration as Embodiment 1 or 2, an explanation of the configuration thereof is omitted.

Operations

Figure 7:
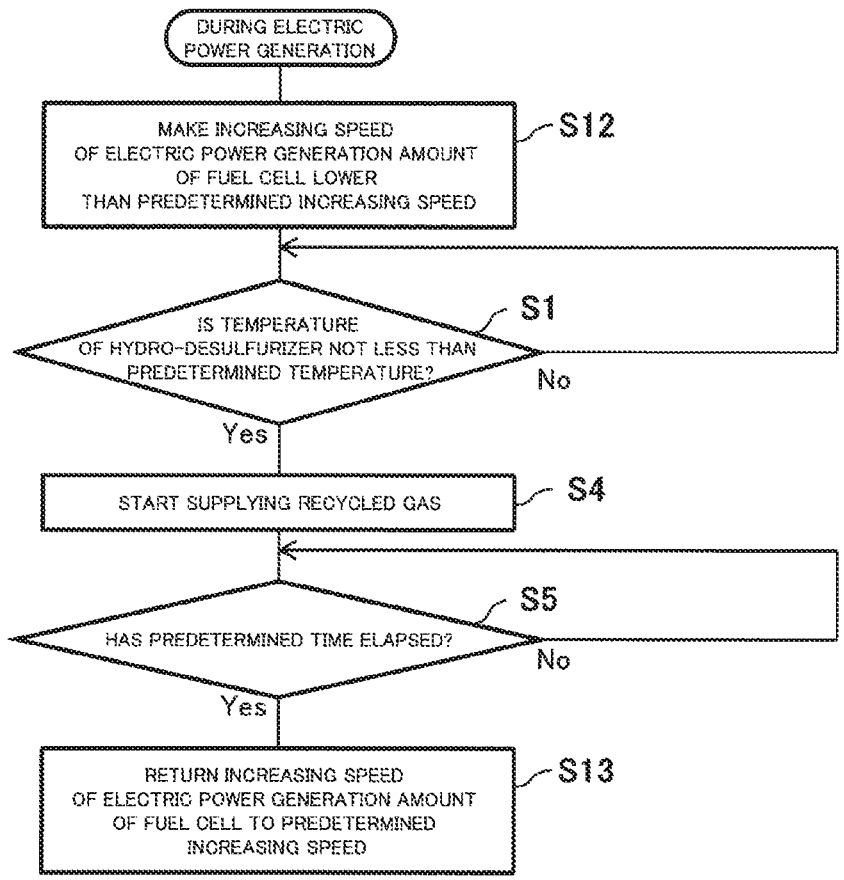
FIG. 7 is a flow chart showing one example of operations of the fuel cell system of Embodiment 5.

FIG. 7 is a flow chart showing one example of operations of the fuel cell system of Embodiment 5. The following operations are performed by the control program of the controller 30.

The present embodiment explains an example in which the supply of the recycled gas to the recycle passage 14 is started in a case where the warm-up of the hydro-desulfurizer 10 is slower than the warm-up of the reformer 11 and the fuel cell 12, for example, in a case where the fuel cell system 100 is generating electric power and the operation of increasing the electric power generation amount when starting up the fuel cell system 100 is performed.

First, before the temperature of the hydro-desulfurizer 10 reaches the predetermined temperature, (i.e., before the warm-up of the hydro-desulfurizer 10 is completed), the increasing speed of the electric power generation amount of the fuel cell 12 is controlled in Step S12 to be lower than the predetermined increasing speed. For example, the increasing speed of the electric power generation amount of the fuel cell 12 is controlled to become a value (for example, 0.2 A/min) smaller than the normal increasing speed (for example, 0.5 A/min) of the electric power generation amount. After the recycled gas reaches the upstream end of the recycle passage 14 through the raw material supply passage 13, the increasing speed of the electric power generation amount of the fuel cell 12 is controlled in Step S13 to return to the predetermined increasing speed. For example, the increasing speed of the electric power generation amount of the fuel cell 12 is controlled to return to the normal increasing speed (for example, 0.5 A/min) of the electric power generation amount.

Since the operations in Steps S1, S4, and S5 of the present embodiment are the same as the operations in Steps S1, S4, and S5 of Embodiment 2, explanations thereof are omitted.

As above, when starting supplying the recycled gas to the recycle passage 14, the increasing speed of the electric power generation amount of the fuel cell 12 is made low, and with this, the reaction of the fuel in the anode of the fuel cell 12 can be suppressed. Thus, the increase in the fuel utilization ratio in the fuel cell 12 can be suppressed within an allowable range.

It should be noted that the operations of the present embodiment may be combined with the operations of Embodiment 1, the operations of Example 1 of Embodiment 2, or the operations of Example 2 of Embodiment 2. For example, Steps S2 and S3 in FIG. 3 or 4 may be performed between Steps S1 and S4 in FIG. 7, and Steps S6 and S7 in FIG. 3 or 4 may be performed between Steps S5 and S13 in FIG. 7. With this, in the present embodiment, the decrease in the amount of anode off gas supplied to the combustor 19 is suppressed as with Example 1 of Embodiment 2. Thus, it is possible to reduce the possibilities of: the deterioration of the combustibility of the combustor 19; the increase in the concentration of carbon monoxide in the combustion exhaust gas of the combustor 19; and the misfire of the combustor 19. Further, as with Example 2 of Embodiment 2, the voltage reduction at the fuel cell 12 is suppressed, and the possibility of the progress of the damage of the anode can be reduced.

It should be noted that the increasing speeds of the electric power generation amount of the fuel cell 12 in Steps S12 and S13 are just examples and are not limited to these examples.

Embodiment 6

The fuel cell system of Embodiment 6 is configured such that the fuel cell system of any one of Embodiments 1 to 5 and Examples 1 and 2 of Embodiment 2 includes: a normal temperature desulfurizer operative to remove the sulfur component in the raw material at normal temperature; a branch passage that branches from the raw material supply passage provided upstream of the normal temperature desulfurizer and joins the raw material supply passage extending between the normal temperature desulfurizer and the hydro-desulfurizer; a first breaker disposed on the branch passage; and a second breaker disposed on the raw material supply passage provided downstream of a branch portion where the branch passage branches from the raw material supply passage and upstream of a joining portion where the branch passage joins the raw material supply passage, wherein: before the temperature of the hydro-desulfurizer reaches the predetermined temperature, the controller controls the first breaker and the second breaker such that the raw material flows through the normal temperature desulfurizer; and when a predetermined time has elapsed since the first breaker is opened after the recycled gas reaches the upstream end of the recycle passage through the raw material supply passage, the controller closes the second breaker.

According to this configuration, until the warm-up of the hydro-desulfurizer is completed, the sulfur component in the raw material can be removed by the normal temperature desulfurizer.

Further, if open-close control operations of the first breaker and the second breaker are performed at the same time, the flow rate of the raw material flowing through the raw material supply passage may temporarily decrease. In this case, a problem that is a temporal decrease in the flow rate of the reformed gas supplied to the anode of the fuel cell may occur. However, in the present embodiment, the control operation of opening the first breaker is performed before the operation of closing the second breaker. Therefore, the above problem can be prevented.

Except for the above features, the fuel cell system of the present embodiment may be the same in configuration as the fuel cell system of any one of Embodiments 1 to 5 and Examples 1 and 2 of Embodiment 2.

Device Configuration

Figure 8:
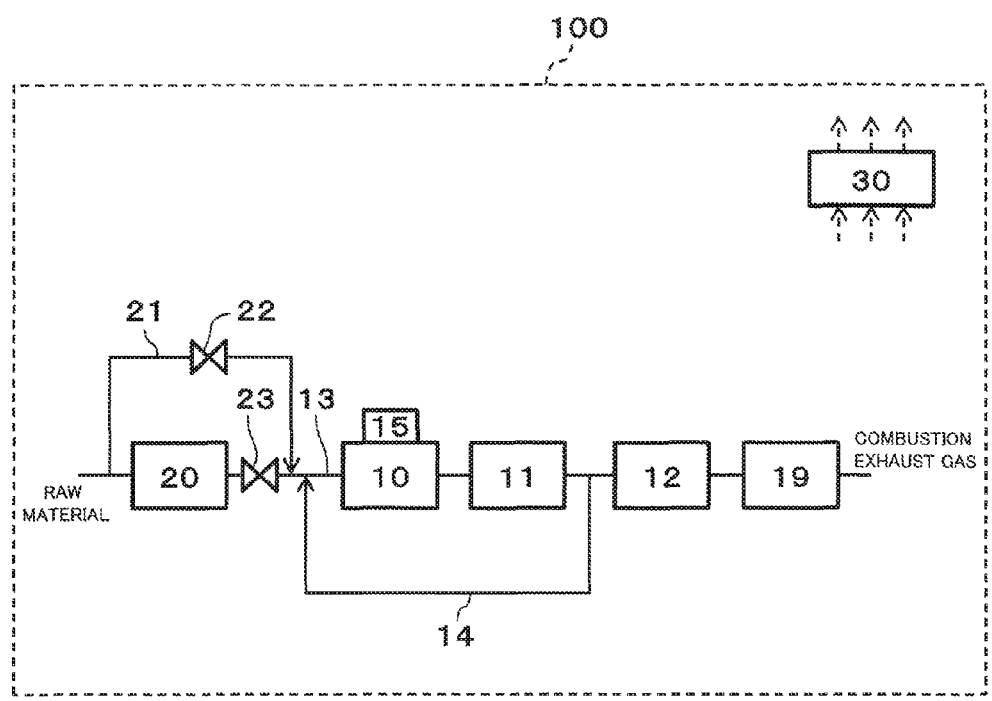
FIG. 8 is a diagram showing one example of the fuel cell system of Embodiment 6.

FIG. 8 is a diagram showing one example of the fuel cell system of Embodiment 6.

In an example shown in FIG. 8, the fuel cell system 100 of the present embodiment includes the hydro-desulfurizer 10, the reformer 11, the fuel cell 12, the raw material supply passage 13, the recycle passage 14, the temperature detector 15, the combustor 19, a normal temperature desulfurizer 20, a branch passage 21, a first breaker 22, a second breaker 23, and the controller 30.

Since the hydro-desulfurizer 10, the reformer 11, the fuel cell 12, the raw material supply passage 13, the recycle passage 14, the temperature detector 15, and the combustor 19 are the same as those in Embodiment 1, explanations thereof are omitted.

The normal temperature desulfurizer 20 removes the sulfur component in the raw material at normal temperature. The term "normal temperature" is used since it is relatively closer to a normal temperature range than a use temperature of the hydro-desulfurizer 10. The "normal temperature" denotes a range from the normal temperature range to a temperature at which the desulfurizing agent used effectively functions as a desulfurizing agent.

The branch passage 21 branches from the raw material supply passage 13 provided upstream of the normal temperature desulfurizer 20 and joins the raw material supply passage 13 extending between the normal temperature desulfurizer 20 and the hydro-desulfurizer 10.

The first breaker 22 is disposed on the branch passage 21. The first breaker 22 may have any configuration as long as it can open and close the branch passage 21. One example of the first breaker 22 is an on-off valve.

The second breaker 23 is disposed on the raw material supply passage 13 provided downstream of a branch portion where the branch passage 21 branches from the raw material supply passage 13 and upstream of a joining portion where the branch passage 21 joins the raw material supply passage 13. The second breaker 23 may have any configuration as long as it can open and close the raw material supply passage 13. One example of the second breaker 23 is an on-off valve.

Before the temperature of the hydro-desulfurizer 10 reaches the predetermined temperature, the controller 30 controls the first breaker 22 and the second breaker 23 such that the raw material flows through the normal temperature desulfurizer 20. The controller 30 closes the second breaker 23 when a predetermined time has elapsed since the first breaker 22 is opened after the recycled gas reaches the upstream end of the recycle passage 14 through the raw material supply passage 13.

The present embodiment has explained a case where the fuel cell system 100 of Embodiment 1 includes the normal temperature desulfurizer 20. However, the fuel cell system 100 of any of Embodiments 2 to 5 and Examples 1 and 2 of Embodiment 2 may include the normal temperature desulfurizer 20.

Operations

Figure 9:
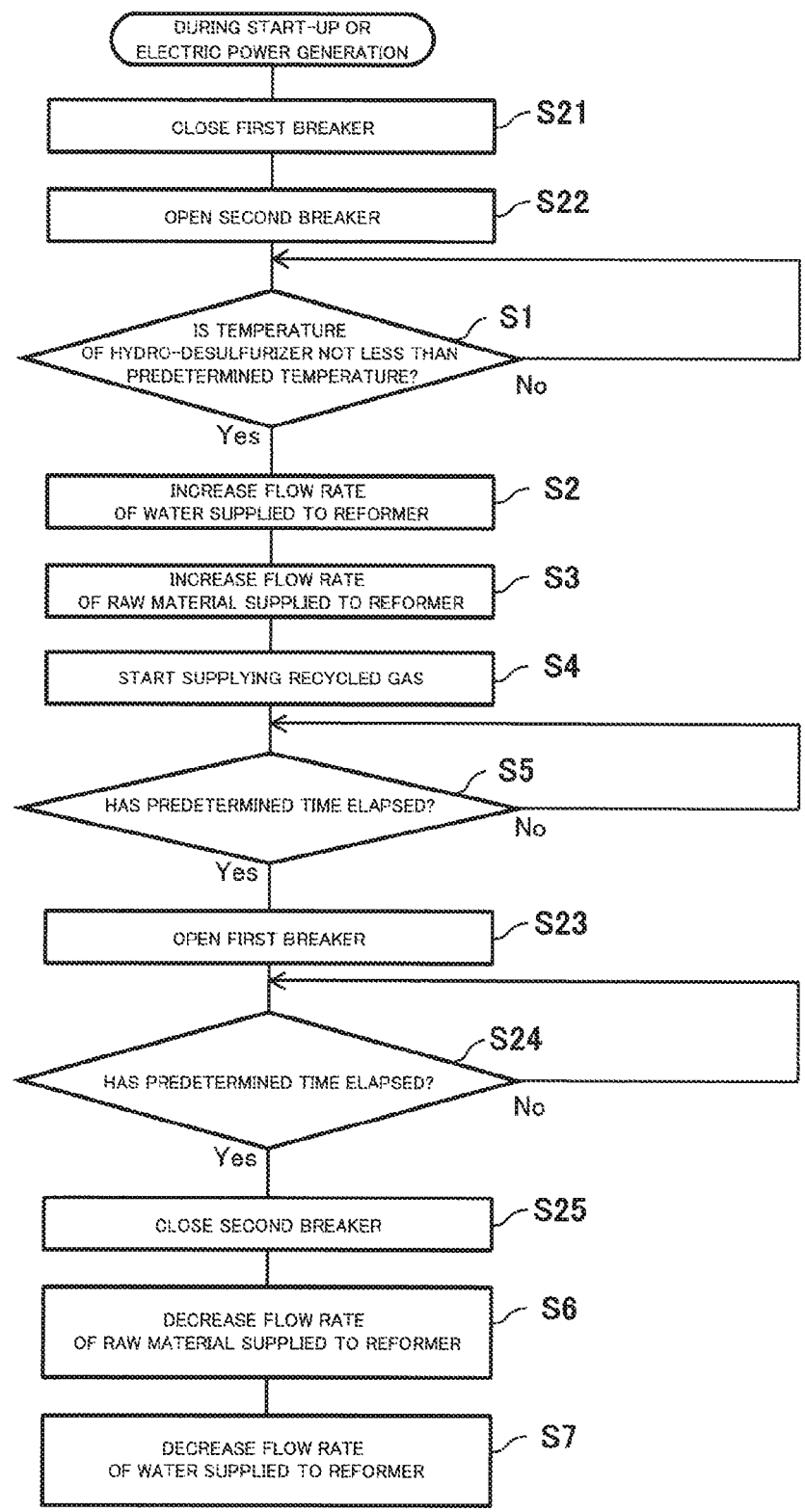
FIG. 9 is a flow chart showing one example of operations of the fuel cell system of Embodiment 6.

FIG. 9 is a flow chart showing one example of operations of the fuel cell system of Embodiment 6. The following operations are performed by the control program of the controller 30.

First, before the temperature of the hydro-desulfurizer 10 reaches the predetermined temperature, (i.e., before the warm-up of the hydro-desulfurizer 10 is completed), the first breaker 22 and the second breaker are controlled such that the raw material flows through the normal temperature desulfurizer 20. For example, the first breaker 22 is closed (Step S21), and the second breaker 23 is opened (Step S22). With this, until the warm-up of the hydro-desulfurizer 10 is completed, the sulfur component in the raw material can be removed by the normal temperature desulfurizer 20.

Further, after the recycled gas reaches the anode of the fuel cell 12, the first breaker 22 is opened in Step S23, and whether or not a predetermined time has elapsed is determined in Step S24.

The predetermined time is set to, for example, a time in which the raw material flowing into the branch passage 21 from the raw material supply passage 13 is assumed to flow through the branch passage 21 to reach the raw material supply passage 13 again. The predetermined time can be calculated based on, for example, the flow rate of the raw material flowing through the branch passage 21 and the cross-sectional area and length of the branch passage 21.

Until the predetermined time in Step S24 elapses, the second breaker 23 is kept open. After the predetermined time in Step S24 elapses, the process proceeds to the next step. In Step S25, the second breaker 23 is closed.

The above operations in Steps S23 to S25 are performed because of the following reasons.

If the open-close control operations of the first breaker 22 and the second breaker 23 are performed at the same time, the flow rate of the raw material flowing through the raw material supply passage 13 may temporarily decrease. In this case, the problem that is the temporal decrease in the flow rate of the reformed gas supplied to the anode of the fuel cell 12 may occur. However, in the present embodiment, the control operation of opening the first breaker 22 is performed before the operation of closing the second breaker 23. Therefore, the above problem can be prevented.

It should be noted that the method of calculating the predetermined time in Step S24 is just an example and is not limited to this example.

Since the operations in Steps S1 to S7 of the present embodiment are the same as the operations in Steps S1 to S7 of Example 1 or 2 of Embodiment 2, explanations thereof are omitted.

Embodiment 7

The fuel cell system of Embodiment 7 includes: a reformer operative to generate a reformed gas using a raw material; a fuel cell operative to generate electric power using the reformed gas; a raw material supply passage through which the raw material supplied to the reformer flows; a hydro-desulfurizer operative to remove a sulfur component in the raw material supplied to the reformer; a recycle passage through which a part of the reformed gas is supplied as a recycled gas to the raw material supply passage provided upstream of the hydro-desulfurizer; a temperature detector operative to detect a temperature of the hydro-desulfurizer; and a controller, wherein: while the fuel cell is generating the electric power and when the temperature of the hydro-desulfurizer reaches a predetermined temperature, the controller makes a current taken out from the fuel cell lower than a current corresponding to a predetermined electric power generation amount of the fuel cell, and then, the controller starts supplying the recycled gas to the recycle passage; and after the recycled gas reaches an upstream end of the recycle passage through the raw material supply passage, the controller returns the current taken out from the fuel cell to the current corresponding to the predetermined electric power generation amount.

According to this configuration, after the warm-up of the hydro-desulfurizer is completed, the current taken out from the fuel cell is temporarily decreased, and with this, the fuel utilization ratio in the anode of the fuel cell can be reduced. Therefore, when starting supplying the recycled gas to the recycle passage, the decrease in the amount of anode off gas supplied from the fuel cell to the combustor is suppressed as compared to conventional cases without increasing the amount of reformed gas supplied from the reformer to the fuel cell. Thus, it is possible to reduce the possibilities of: the deterioration of the combustibility of the combustor; the increase in the concentration of carbon monoxide in the combustion exhaust gas of the combustor; and the misfire of the combustor. Further, as compared to conventional cases, the voltage reduction at the fuel cell is suppressed, and the possibility of the progress of the damage of the anode can be reduced.

Device Configuration

The fuel cell system 100 of the present embodiment is the same in configuration as the fuel cell system 100 shown in FIG. 1 or 2. Since the present embodiment is the same in configuration as Embodiment 1 or 2, an explanation of the configuration thereof is omitted.

Operations

Figure 10:
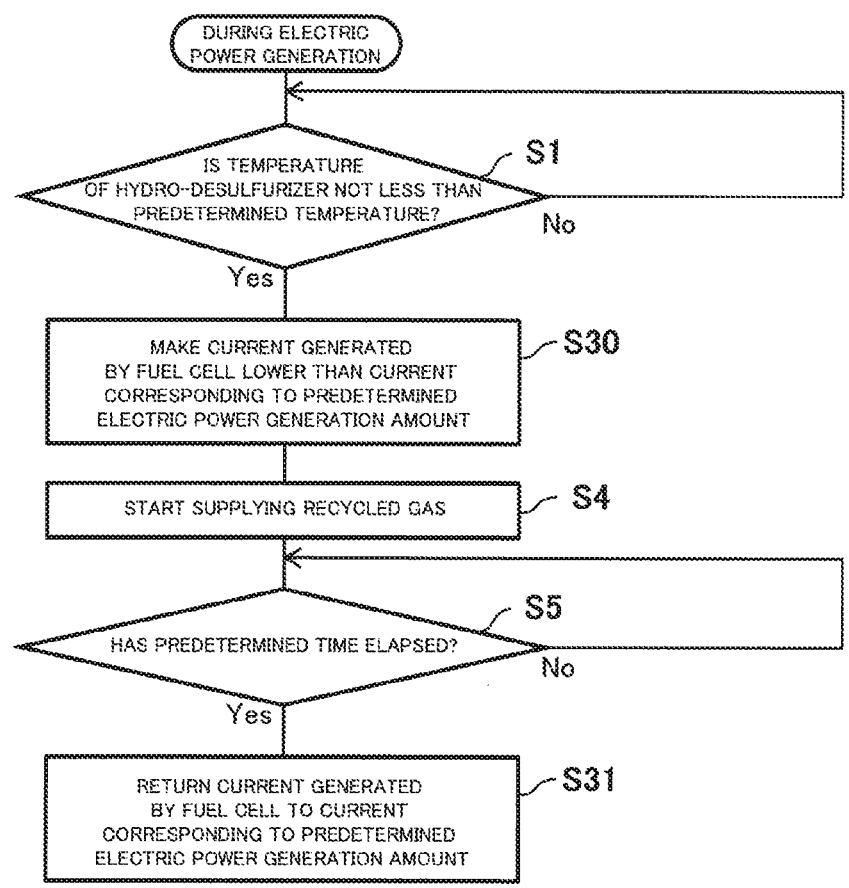
FIG. 10 is a flow chart showing one example of operations of the fuel cell system of Embodiment 7.

FIG. 10 is a flow chart showing one example of operations of the fuel cell system of Embodiment 7. The following operations are performed by the control program of the controller 30.

The present embodiment explains an example in which the supply of the recycled gas to the recycle passage 14 is started in a case where the warm-up of the hydro-desulfurizer 10 is slower than the warm-up of the reformer 11 and the fuel cell 12, for example, in a case where the fuel cell system 100 is generating electric power and the rated operation of the fuel cell 12 is performed.

First, whether or not the temperature of the hydro-desulfurizer 10 is not less than the predetermined temperature is determined in Step S1. For example, when the hydrodesulfurizing agent contains copper and zinc, an appropriate operating temperature range of the hydro-desulfurizer 10 is about 150 to 350° C. Therefore, in this case, the predetermined temperature in Step S1 is set to, for example, 180° C.

When the temperature of the hydro-desulfurizer 10 is less than the predetermined temperature, the current taken out from the fuel cell 12 (i.e., the current generated by the fuel cell 12) is maintained without change.

When the temperature of the hydro-desulfurizer 10 reaches the predetermined temperature, the process proceeds to the next step. In Step S30, the current generated by the fuel cell 12 is controlled to be lower than the current corresponding to the predetermined electric power generation amount of the fuel cell 12. For example, the current generated by the fuel cell 12 is reduced from the current corresponding to the predetermined electric power generation amount of the fuel cell 12 by a current (for example, about 3% of the current corresponding to the predetermined electric power generation amount) corresponding to an electric power generation amount generated by the flow rate corresponding to the flow rate of the recycled gas.

Then, in Step S4, the supply of the recycled gas to the recycle passage 14 is started. With this, hydrogen can be added to the raw material flowing toward the hydro-desulfurizer 10. As a result, the hydro-desulfurizer 10 can perform hydrodesulfurization of the raw material by utilizing the hydrogen.

The above operations in Steps S30 and S4 are performed because of the following reasons.

After the warm-up of the hydro-desulfurizer 10 is completed, the current taken out from the fuel cell 12 is temporarily decreased, and with this, the fuel utilization ratio in the anode of the fuel cell 12 can be reduced. Therefore, when starting supplying the recycled gas to the recycle passage 14, the decrease in the amount of anode off gas supplied from the fuel cell 12 to the combustor 19 is suppressed without increasing the amount of reformed gas supplied from the reformer 11 to the fuel cell 12. Thus, it is possible to reduce the possibilities of: the deterioration of the combustibility of the combustor 19; the increase in the concentration of carbon monoxide in the combustion exhaust gas of the combustor 19; and the misfire of the combustor 19. Further, the voltage reduction at the fuel cell 12 is suppressed, and the possibility of the progress of the damage of the anode can be reduced.

Next, whether or not a predetermined time has been elapsed since the start of the supply of the recycled gas to the recycle passage 14 is determined in Step S5.

This predetermined time is set to, for example, a time in which the recycled gas is assumed to flow through the recycle passage 14 and the raw material supply passage 13 to reach the upstream end of the recycle passage 14. The predetermined time can be calculated based on, for example, the flow rate of the recycled gas, the cross-sectional areas of the recycle passage 14 and the raw material supply passage 13, and a length from the upstream end of the recycle passage 14 through the raw material supply passage 13 back to the upstream end of the recycle passage 14.

Until the predetermined time in Step S5 elapses, the current generated by the fuel cell 12 is maintained without change.

When the predetermined time in Step S5 elapses, the process proceeds to the next step. In Step S31, the current generated by the fuel cell 12 is controlled to return to the current corresponding to the predetermined electric power generation amount of the fuel cell 12.

The above operation in Step S31 is performed because of the following reasons.

After the elapse of the time in which the recycled gas is assumed to flow through the recycle passage 14 and the raw material supply passage 13 to reach the anode of the fuel cell 12, it can be determined that the temporal decrease in the flow rate of the reformed gas supplied to the anode of the fuel cell 12 has been resolved. Therefore, in this case, the current generated by the fuel cell 12 can return to the current corresponding to the predetermined electric power generation amount of the fuel cell 12, that is, the current corresponding to a normal operation state.

It should be noted that the temperature of the hydro-desulfurizer 10 in Step S1, the current in Step S30, and the method of calculating the predetermined time in Step S5 are just examples and are not limited to these examples.

Modified Example

The fuel cell system of Modified Example of Embodiment 7 is configured such that the fuel cell system of Embodiment 7 includes: a normal temperature desulfurizer operative to remove the sulfur component in the raw material at normal temperature; a branch passage that branches from the raw material supply passage provided upstream of the normal temperature desulfurizer and joins the raw material supply passage extending between the normal temperature desulfurizer and the hydro-desulfurizer; a first breaker disposed on the branch passage; and a second breaker disposed on the raw material supply passage provided downstream of a branch portion where the branch passage branches from the raw material supply passage and upstream of a joining portion where the branch passage joins the raw material supply passage, wherein: before the temperature of the hydro-desulfurizer reaches the predetermined temperature, the controller controls the first breaker and the second breaker such that the raw material flows through the normal temperature desulfurizer; and when a predetermined time has elapsed since the first breaker is opened after the recycled gas reaches the upstream end of the recycle passage through the raw material supply passage, the controller closes the second breaker.

According to this configuration, until the warm-up of the hydro-desulfurizer is completed, the sulfur component in the raw material can be removed by the normal temperature desulfurizer.

If the open-close control operations of the first breaker and the second breaker are performed at the same time, the flow rate of the raw material flowing through the raw material supply passage may temporarily decrease. In this case, the problem that is the temporal decrease in the flow rate of the reformed gas supplied to the anode of the fuel cell 12 may occur. However, in the present modified example, the control operation of opening the first breaker is performed before the operation of closing the second breaker. Therefore, the above problem can be prevented.

Except for the above features, the fuel cell system of the present modified example may be the same in configuration as the fuel cell system of Embodiment 7.

Device Configuration

The fuel cell system 100 of the present modified example is the same in configuration as the fuel cell system 100 shown in FIG. 8. Since the present modified example is the same in configuration as Embodiment 6, an explanation of the configuration thereof is omitted.

Operations

Figure 11:
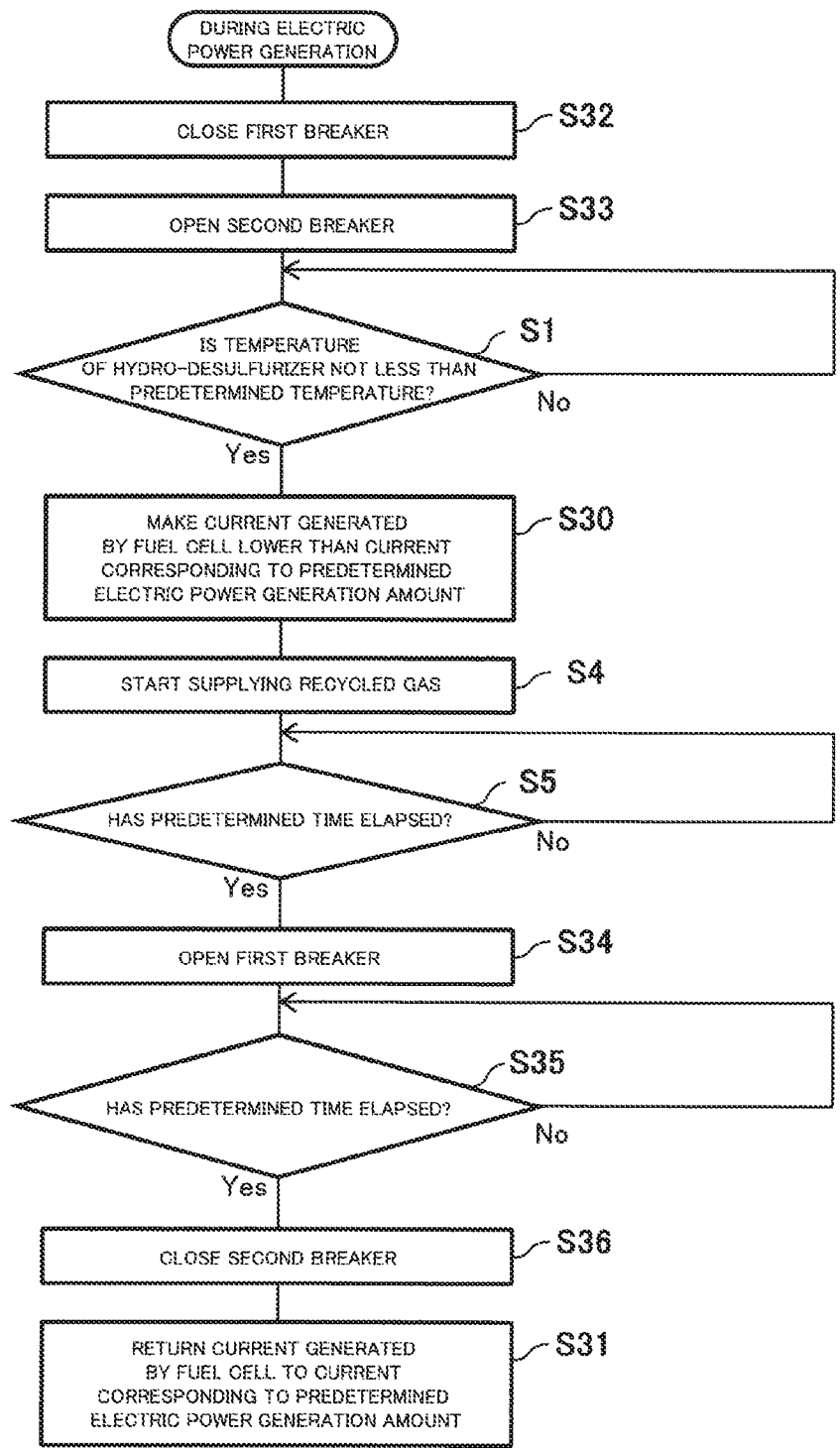
FIG. 11 is a flow chart showing one example of operations of the fuel cell system of Modified Example of Embodiment 7.

FIG. 11 is a flow chart showing one example of operations of the fuel cell system of Modified Example of Embodiment 7. The following operations are performed by the control program of the controller 30.

The present modified example explains an example in which the supply of the recycled gas to the recycle passage 14 is started in a case where the warm-up of the hydro-desulfurizer 10 is slower than the warm-up of the reformer 11 and the fuel cell 12, for example, in a case where the fuel cell system 100 is generating electric power and the rated operation of the fuel cell 12 is performed.

First, before the temperature of the hydro-desulfurizer 10 reaches the predetermined temperature, (i.e., before the warm-up of the hydro-desulfurizer 10 is completed), the first breaker 22 and the second breaker are controlled such that the raw material flows through the normal temperature desulfurizer 20. For example, the first breaker 22 is closed (Step S32), and the second breaker 23 is opened (Step S33). With this, until the warm-up of the hydro-desulfurizer 10 is completed, the sulfur component in the raw material can be removed by the normal temperature desulfurizer 20.

Further, after the recycled gas reaches the upstream end of the recycle passage through the raw material supply passage, the first breaker 22 is opened in Step S34, and whether or not the predetermined time has elapsed is determined in Step S35.

The predetermined time is set to, for example, a time in which the raw material flowing into the branch passage 21 from the raw material supply passage 13 is assumed to flow through the branch passage 21 to reach the raw material supply passage 13 again. The predetermined time can be calculated based on, for example, the flow rate of the raw material flowing through the branch passage 21 and the cross-sectional area and length of the branch passage 21.

Until the predetermined time in Step S35 elapses, the second breaker 23 is kept open. After the predetermined time in Step S35 elapses, the process proceeds to the next step. In Step S36, the second breaker 23 is closed.

The above operations in Steps S34 to S36 are performed because of the following reasons.

If the open-close control operations of the first breaker 22 and the second breaker 23 are performed at the same time, the flow rate of the raw material flowing through the raw material supply passage 13 may temporarily decrease. In this case, the problem that is the temporal decrease in the flow rate of the reformed gas supplied to the anode of the fuel cell 12 may occur. However, in the present modified example, the control operation of opening the first breaker 22 is performed before the operation of closing the second breaker 23. Therefore, the above problem can be prevented.

It should be noted that the method of calculating the predetermined time in Step S35 is just an example and is not limited to this example.

Since the operations in Steps S1, S4, and S5 of the present modified example are the same as the operations in Steps S1, S4, and S5 of Embodiment 7, explanations thereof are omitted.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

One aspect of the present invention is capable of more appropriately dealing with the problems caused when starting supplying the recycled gas to the recycle passage after the warm-up of the hydro-desulfurizer is completed, than conventional cases. Therefore, the aspect of the present invention is utilized in, for example, fuel cell systems.

REFERENCE SIGNS LIST 10 hydro-desulfurizer
11 reformer
12 fuel cell 13 raw material supply passage
14 recycle passage
15 temperature detector
16 vaporizer
17 water supplier
18 air supplier
19 combustor
20 normal temperature desulfurizer
21 branch passage
22 first breaker
23 second breaker
30 controller
100 fuel cell system

The invention claimed is:

1. A fuel cell system comprising:
a reformer operative to generate a reformed gas using a raw material;
a fuel cell operative to generate electric power using the reformed gas;
a raw material supply passage through which the raw material supplied to the reformer flows;
a hydro-desulfurizer operative to remove a sulfur component in the raw material supplied to the reformer;
a recycle passage through which a part of the reformed gas is supplied as a recycled gas to the raw material supply passage provided upstream of the hydro-desulfurizer;
a temperature detector operative to detect a temperature of the hydro-desulfurizer; and
a controller configured such that:
when the temperature of the hydro-desulfurizer detected by the temperature detector reaches a predetermined temperature, the controller increases a flow rate of the raw material from a predetermined flow rate by a flow rate corresponding to a flow rate of the recycled gas, and then, the controller starts supplying the recycled gas to the recycle passage; and
after the recycled gas reaches an upstream end of the recycle passage through the raw material supply passage, the controller returns the flow rate of the raw material to the predetermined flow rate.

2. The fuel cell system according to claim 1, comprising:
a vaporizer operative to vaporize water supplied to the reformer; and
a water supplier operative to supply the water to the vaporizer, wherein:
the reformer generates the reformed gas using steam and the raw material;
when the temperature of the hydro-desulfurizer reaches the predetermined temperature, the controller increases a flow rate of the water from a predetermined flow rate by a flow rate corresponding to the flow rate of the recycled gas, and then, the controller starts supplying the recycled gas to the recycle passage; and
after the recycled gas reaches the upstream end of the recycle passage through the raw material supply passage, the controller returns the flow rate of the water to the predetermined flow rate.

3. The fuel cell system according to claim 1, wherein while the fuel cell is generating the electric power, the predetermined flow rate is a flow rate corresponding to a predetermined electric power generation amount of the fuel cell.

4. A fuel cell system comprising:
a reformer operative to generate a reformed gas using a raw material;
a fuel cell operative to generate electric power using the reformed gas;
a raw material supply passage through which the raw material supplied to the reformer flows;
a hydro-desulfurizer operative to remove a sulfur component in the raw material supplied to the reformer;
a recycle passage through which a part of the reformed gas is supplied as a recycled gas to the raw material supply passage provided upstream of the hydro-desulfurizer;
a temperature detector operative to detect a temperature of the hydro-desulfurizer; and
a controller configured such that:
while the fuel cell is generating the electric power and before the temperature of the hydro-desulfurizer detected by the temperature detector reaches a predetermined temperature, the controller keeps an electric power generation amount of the fuel cell to be equal to or less than power consumption necessary for driving the fuel cell system such that the electric power is not supplied to an external load; and
after the recycled gas reaches an upstream end of the recycle passage through the raw material supply passage, the controller returns the electric power generation amount of the fuel cell to such an amount that supply of the electric power to the external load is realized.

5. A fuel cell system comprising:
a reformer operative to generate a reformed gas using a raw material;
a fuel cell operative to generate electric power using the reformed gas;
a raw material supply passage through which the raw material supplied to the reformer flows;
a hydro-desulfurizer operative to remove a sulfur component in the raw material supplied to the reformer;
a recycle passage through which a part of the reformed gas is supplied as a recycled gas to the raw material supply passage provided upstream of the hydro-desulfurizer;
a temperature detector operative to detect a temperature of the hydro-desulfurizer; and
a controller configured such that:
while the fuel cell is generating the electric power and before the temperature of the hydro-desulfurizer detected by the temperature detector reaches a predetermined temperature, the controller keeps an electric power generation amount of the fuel cell to be less than an output of a rated operation of the fuel cell system; and
after the recycled gas reaches an upstream end of the recycle passage through the raw material supply passage, the controller returns the electric power generation amount of the fuel cell to such an amount that the output of the rated operation of the fuel cell system is realized.

6. A fuel cell system comprising:
a reformer operative to generate a reformed gas using a raw material;
a fuel cell operative to generate electric power using the reformed gas;
a raw material supply passage through which the raw material supplied to the reformer flows;
a hydro-desulfurizer operative to remove a sulfur component in the raw material supplied to the reformer;

a recycle passage through which a part of the reformed gas is supplied as a recycled gas to the raw material supply passage provided upstream of the hydro-desulfurizer;

a temperature detector operative to detect a temperature of the hydro-desulfurizer; and a controller configured such that:

while the fuel cell is generating the electric power and before the temperature of the hydro-desulfurizer detected by the temperature detector reaches a predetermined temperature, the controller makes an increasing speed of an electric power generation amount of the fuel cell lower than a predetermined increasing speed; and after the recycled gas reaches an upstream end of the recycle passage through the raw material supply passage, the controller returns the increasing speed of the electric power generation amount of the fuel cell to the predetermined increasing speed.

7. The fuel cell system according to claim 1, comprising:

a normal temperature desulfurizer operative to remove the sulfur component in the raw material at normal temperature;

a branch passage that branches from the raw material supply passage provided upstream of the normal temperature desulfurizer and joins the raw material supply passage extending between the normal temperature desulfurizer and the hydro-desulfurizer;

a first breaker disposed on the branch passage; and a second breaker disposed on the raw material supply passage provided downstream of a branch portion where the branch passage branches from the raw material supply passage and upstream of a joining portion where the branch passage joins the raw material supply passage, wherein:

before the temperature of the hydro-desulfurizer reaches the predetermined temperature, the controller controls the first breaker and the second breaker such that the raw material flows through the normal temperature desulfurizer; and when a predetermined time has elapsed since the first breaker is opened after the recycled gas reaches the upstream end of the recycle passage through the raw material supply passage, the controller closes the second breaker.

8. A fuel cell system comprising:

a reformer operative to generate a reformed gas using a raw material;

a fuel cell operative to generate electric power using the reformed gas;

a raw material supply passage through which the raw material supplied to the reformer flows;

a hydro-desulfurizer operative to remove a sulfur component in the raw material supplied to the reformer;

a recycle passage through which a part of the reformed gas is supplied as a recycled gas to the raw material supply passage provided upstream of the hydro-desulfurizer;

a temperature detector operative to detect a temperature of the hydro-desulfurizer; and a controller configured such that:

while the fuel cell is generating the electric power and when the temperature of the hydro-desulfurizer detected by the temperature detector reaches a predetermined temperature, the controller makes a current taken out from the fuel cell lower than a current corresponding to a predetermined electric power generation amount of the fuel cell, and then, the controller starts supplying the recycled gas to the recycle passage; and after the recycled gas reaches an upstream end of the recycle passage through the raw material supply passage, the controller returns the current taken out from the fuel cell to the current corresponding to the predetermined electric power generation amount.

9. The fuel cell system according to claim 8, comprising:

a normal temperature desulfurizer operative to remove a sulfur component in the raw material at normal temperature;

a branch passage that branches from the raw material supply passage provided upstream of the normal temperature desulfurizer and joins the raw material supply passage extending between the normal temperature desulfurizer and the hydro-desulfurizer;

a first breaker disposed on the branch passage; and a second breaker disposed on the raw material supply passage provided downstream of a branch portion where the branch passage branches from the raw material supply passage and upstream of a joining portion where the branch passage joins the raw material supply passage, wherein:

before the temperature of the hydro-desulfurizer reaches the predetermined temperature, the controller controls the first breaker and the second breaker such that the raw material flows through the normal temperature desulfurizer; and when a predetermined time has elapsed since the first breaker is opened after the recycled gas reaches the upstream end of the recycle passage through the raw material supply passage, the controller closes the second breaker.

10. The fuel cell system according to claim 1, wherein the controller includes a calculation processing portion and a storage portion, the storage portion storing a control program to be executed by the calculation processing portion.

11. The fuel cell system according to claim 4, wherein the controller includes a calculation processing portion and a storage portion, the storage portion storing a control program to be executed by the calculation processing portion.

12. The fuel cell system according to claim 5, wherein the controller includes a calculation processing portion and a storage portion, the storage portion storing a control program to be executed by the calculation processing portion.

13. The fuel cell system according to claim 6, wherein the controller includes a calculation processing portion and a storage portion, the storage portion storing a control program to be executed by the calculation processing portion.

14. The fuel cell system according to claim 8, wherein the controller includes a calculation processing portion and a storage portion, the storage portion storing a control program to be executed by the calculation processing portion.

* * * * *